US010581886B1

(12) United States Patent
Sharifi Mehr

(10) Patent No.: US 10,581,886 B1
(45) Date of Patent: Mar. 3, 2020

(54) COMPUTER SYSTEM ANOMALY DETECTION

(71) Applicant: Amazon Technologies, Inc., Seattle, WA (US)

(72) Inventor: Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 15/182,424

(22) Filed: Jun. 14, 2016

(51) Int. Cl.
*H04L 29/06* (2006.01)

(52) U.S. Cl.
CPC ...... *H04L 63/1425* (2013.01); *H04L 63/1416* (2013.01); *H04L 63/1441* (2013.01)

(58) Field of Classification Search
CPC ............. H04L 63/1425; H04L 63/1416; H04L 63/1441
See application file for complete search history.

(56) References Cited

U.S. PATENT DOCUMENTS

| | | | |
|---|---|---|---|
| 9,323,599 B1 | 4/2016 | Iyer et al. | |
| 2008/0301796 A1* | 12/2008 | Holostov | H04L 63/105 726/12 |
| 2009/0055838 A1 | 2/2009 | Sedukhin et al. | |
| 2013/0326049 A1 | 12/2013 | Talton | |
| 2015/0195158 A1* | 7/2015 | Nakano | H04L 43/04 709/224 |
| 2015/0304349 A1* | 10/2015 | Bernstein | H04L 63/1425 726/22 |
| 2015/0358391 A1 | 12/2015 | Moon et al. | |
| 2016/0094422 A1 | 3/2016 | Poola et al. | |
| 2016/0219067 A1* | 7/2016 | Han, II | H04L 63/1425 |
| 2016/0378614 A1 | 12/2016 | Thanasekaran | |
| 2017/0098093 A1* | 4/2017 | Koo | G06F 21/6209 |
| 2017/0124502 A1* | 5/2017 | Brew | G06Q 10/06393 |
| 2017/0171231 A1* | 6/2017 | Reybok, Jr. | H04L 63/14 |
| 2017/0317905 A1 | 11/2017 | Schimmelpfeng et al. | |
| 2018/0039674 A1 | 2/2018 | Seyvet et al. | |

OTHER PUBLICATIONS

Lane, "Machine Learning Techniques for the Domain of Anomaly Detection for Computer Security," Jul. 1998, pp. 1-80, https://pdfs.semanticscholar.org/773d/d507c7a2315848af3594a94b96a463af412f.pdf (Year: 1998).*

(Continued)

*Primary Examiner* — Robert B Leung
(74) *Attorney, Agent, or Firm* — Davis Wright Tremaine LLP

(57) ABSTRACT

An event-analysis system detects anomalies in the operation of a service by processing operational logs, trace files, and event databases produced by the service in accordance with a hierarchical behavioral profile. The event analysis system converts the operational logs, trace files, and event databases into a normalized event stream which is sent to an analysis engine. The analysis engine converts the stream of normalized events to a set of metrics maintained in association with the profile hierarchy. Operational anomalies of the service are detected by analyzing incoming events in the context of metrics maintained in association with applicable leaf-node profiles, root node profiles, and intermediate node profiles.

20 Claims, 20 Drawing Sheets

(56) References Cited

OTHER PUBLICATIONS

Menon et al., "Effective Techniques to Detect Anomalies in System Logs", Aug. 2006, pp. 1-47. https://pdfs.semanticscholar.org/3564/174625ef21cb916e9d245d5fdcbd0178fc9a.pdf (Year: 2006).*

Liang et al., "An Adaptive Anomaly Detection based on Hierarchical Clustering" IEEE, Dec. 2009, pp. 1626-1629, https://ieeexplore.ieee.org/stamp/stamp.jsp?tp=&arnumber=5454947 (Year: 2009).*

Zhang et al., "Anomaly Detection: A Robust Approach to Detection of Unanticipated Faults" IEEE, Aug. 2008, pp. 1-8 https://ieeexplore.ieee.org/stamp/stamp.jsp?tp=&arnumber=4711445 (Year: 2008).*

Lane, "machine Learning Techniques for the Domian of Anomaly Detection for Computer Security," Jul. 1998, pp. 1-80, https://pdfs.semanticscholar.org/773d/d507c7a2315848af3594a94b96a463af412f.pdf (Year: 1998).*

Kusters, N.P., et al., "Burst Throttling With Sequential Operation Detection," U.S. Appl. No. 14/675,730, filed Mar. 31, 2015.

Seidenberg, B.E., and G.A. Rubin, "Data Exfiltration Control," U.S. Appl. No. 15/176,048, filed Jun. 7, 2016.

\* cited by examiner

COMPUTER SYSTEM ANOMALY DETECTION

BACKGROUND

In many computer systems, system profiling is used as a method of detecting system anomalies. Events, states, and actions that occur within the system are monitored and recorded during a learning period, and a behavioral profile is generated based at least in part on the events, states, and actions recorded during the learning period. The behavioral profile includes values and statistics that describe the behavior of the system when partitioned along various behavioral dimensions. For example, a profile for monitoring requests to a web service may describe the system along two behavioral dimensions: a requester identity associated with each request, and a geolocation for the origin of each request. Deviations from the behavioral profile can indicate an anomaly such as a security breach, hardware fault, or other error.

While appropriate partitioning of the information helps to create behavioral profiles that achieve various anomaly detection goals, incorrect partitioning can result in loss of valuable information that could be captured with appropriate partitioning. As a result, proper partitioning of information for anomaly detection is an important problem.

BRIEF DESCRIPTION OF THE DRAWINGS

Various techniques will be described with reference to the drawings, in which.

DETAILED DESCRIPTION

Figure 1:
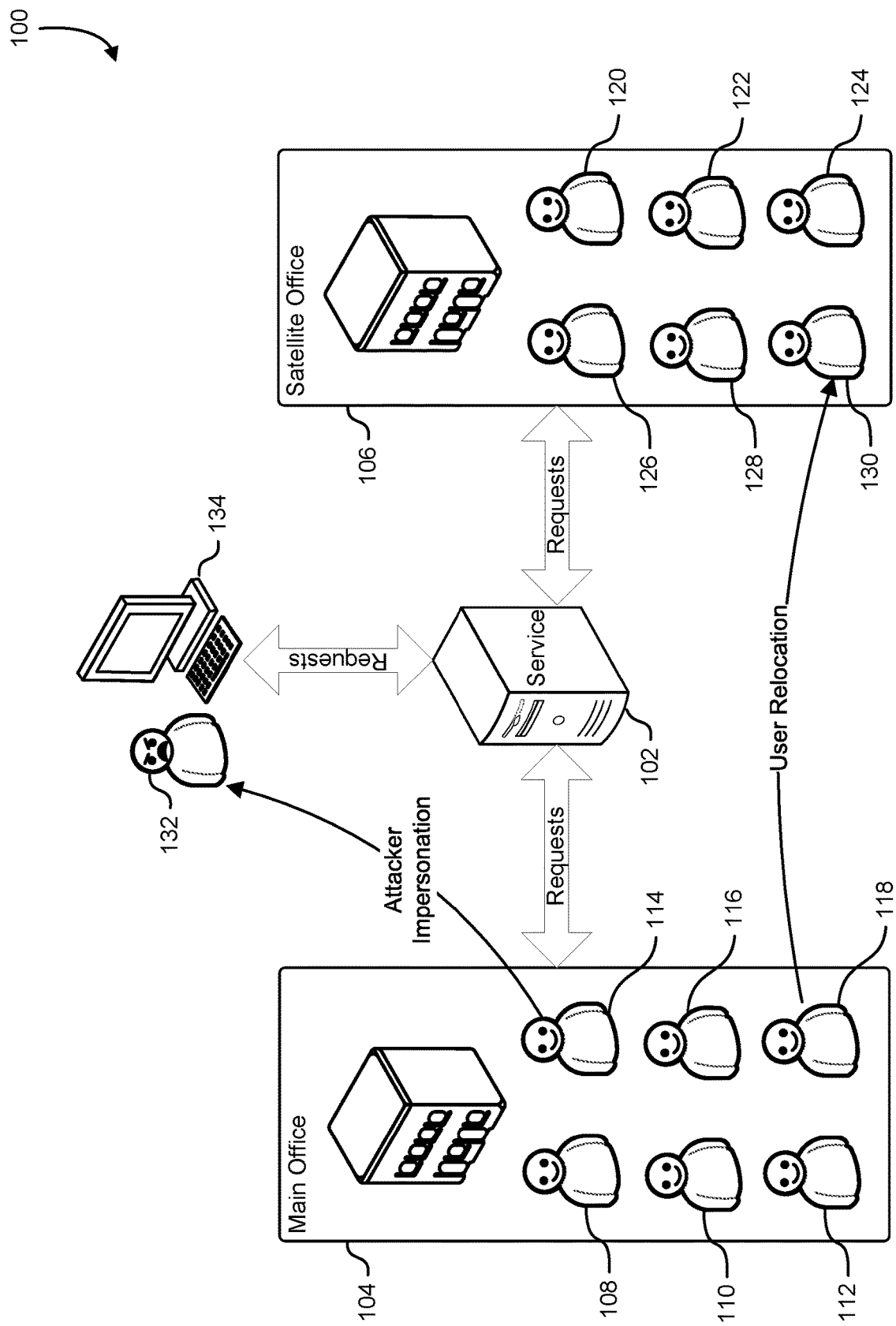
FIG. 1 shows an illustrative example of an environment in which various embodiments may be practiced.

The current document describes an anomaly detection system that improves the security and efficiency of a service by analyzing events using a set of hierarchical behavioral profiles to identify anomalies and threats to the service. The anomaly detection system enables the efficient analysis of events by converting event streams produced by a computing system into a collection of associated metrics that are organized into a hierarchy of behavioral profiles. The metrics and associated behavioral profiles allow the detection of behavioral anomalies within the system by analyzing the incoming invents in the context of applicable behavioral profiles. The identified anomalies may be further analyzed to generate an additional level of metrics. The additional level of metrics allows for the detection of statistical abnormalities within the detected anomalies. In some examples, the additional level of metrics are used to establish a level of confidence for the identified anomalies.

The anomaly detection system uses a set of hierarchical behavioral profiles to partition and analyze the events in more than one way, thereby retaining information that would otherwise be lost if the events were analyzed using a single partition. For example, if service-request events are partitioned and analyzed at the service level, the resulting metrics can be used to determine that the service receives an average of 500 requests per second, however, information regarding the average number of service requests per requester is lost. If the service-request events are partitioned at the requester level, behavioral changes by a single requester can be detected, but it may be difficult to determine whether a particular behavioral change is within a range of expected behavioral norms for the service as a whole. Using a collection of hierarchical behavioral profiles, the system is able to partition service events in more than one way. This allows the system to detect changes in user behavior, and further identify when the changes in behavior are within expected norms by comparing the behavior to the behaviors of other similar users, and by comparing the behavior to aggregate system-wide behavior.

The use of hierarchical behavioral profiles may reduce the loss of information which can cause inaccuracies in the operation of single-profile-based anomaly detection systems. Hierarchical behavioral profiles include behavioral profiles created at multiple levels. Behavioral profiles may be created for a requester's identity (i.e., user/role), a requester's identity pool (i.e., account), or for the service being monitored. The profiles may be retained in a tree structure. In some examples, the behavioral profile for the system is retained at the root-node of the tree, behavioral profiles for each requester's identity pool are retained as children of the root node, and profiles for each requester's identity are retained under the associated identity pool's profile.

The system harvests events from various sources of operational information such as log files, trace files, or system diagnostic databases. The system extracts events from the operational information, and normalizes the extracted events into a common event format and produces a normalized event stream. An event can have a number of associated dimensions. A dimension is a parameter, value, property, or characteristic of an event. For example, events derived from a particular log file may have a set of dimensions comprising an "identity pool" and an "identity key." If a particular event derived from the particular log file lacks one or more of the expected dimensions, the particular event may be flagged or discarded when processed by a metrics authority that is configured for the event source.

During the process of event analysis, each normalized event can be associated with one or more profiles. The profiles with which an event is associated may be based at least in part on the type of the event, the source of the event, or a dimension of the event. In some examples, a metrics authority associates events from a particular event source to a particular profile. For example, normalized events extracted from the log files of a network computing service may be processed with a metrics authority configured to process events from the network computing service. Events processed by the metrics authority configured to process events from the network computing service are associated with a particular profile determined by the metrics authority. The profiles associated with an event identify one or more profile metrics for the event which can be calculated by the metrics authority.

When the system receives an event, the system identifies a leaf-node profile associated with the event from the set of hierarchical behavioral profiles. If the event includes dimensions that correspond to the parameters found in the leaf-node profile, then the event is processed by the system in accordance with the identified leaf-node profile and a set of leaf-node profile metrics are updated. The system repeats this process for a parent profile of the leaf-node profile, comparing the event dimensions to metrics in the parent-node profile. Additional metrics are generated for the parent node and recorded. The system continues this process until it reaches the root node of the hierarchical behavioral profile.

Anomalies are identified by generating a score based at least in part on a number of profile features that match corresponding dimensions of an event. A weight is assigned to each match at a given level within the hierarchical behavioral profile, and a total score determined by adding the weight of the matches at each level. In one example, an event has two features of user-agent and geo-location, and three profile levels. The root level of the profile has a weight of 0.25, the intermediate level of the profile has a weight of 0.75, and the leaf nodes of the profile have a weight of 1.0. If the event matches a feature in the 3rd level of the profile (i.e., a leaf-node profile), 1.0 point is added to the score. If the event matches a feature on the 2nd level profile (i.e., the profile node between root node and leaf node), then 0.75 points are added to the score. If the event matches a feature at the root level of the profile, 0.25 points are added to the score. Therefore, for the above example, if two features of the event match features at the leaf level of the profile, the resulting score is 2.0 (2 matches×a weight of 1.0). If one feature matches at the leaf level and one feature matches at the root level, the resulting score is 1.25 ((1 match×a weight of 1.0)+(1 match×a weight of 0.25)). This is compared against a threshold value to determine whether an anomaly is indicated.

For each event processed by the system, one or more metrics are determined by the configured metrics authority in accordance with the profile of the event. In some examples, an analysis throttler or filter is used to reduce the number of metrics tracked in a metrics engine. For example, if a particular profile produces large numbers of metrics that are not useful, or result in a disproportionate number of false positives, such "noisy" metrics can be filtered and discarded before they are forwarded to the metrics engine. The resulting filtered set of metrics is forwarded to the metrics engine and registered for later use.

In some examples, events are received by an event throttling system. Incoming events are duplicated and processed through two pipelines. One pipeline includes an analysis throttle which feeds filtered events at a controlled rate to an analysis engine. Another pipeline includes a metrics engine throttle which feeds filtered events at a controlled rate to a metrics engine. The analysis engine pulls metrics from the metrics engine, and the metrics are used to identify events which represent system anomalies. The event stream provided to the metrics engine and the event stream provided to the analysis engine may be unsynchronized, so that the process of updating and generating metrics occurs asynchronously to the analysis of events received via the analysis throttle.

The analysis throttle may perform prioritization of incoming events so that events which are more likely to represent a system anomaly are analyzed prior to other incoming events. This may result in a reordering of the events supplied to the analysis engine. Event prioritization may be based at least in part on the source of each event. For example, events originating from trusted entities may be de-prioritized and events originating from suspect entities identified in the thread database may be processed with increased priority. The analysis throttle includes an event filter. The event filter may remove events from the event stream that originate from trusted entities, or remove event types that are not useful for identifying anomalies. The analysis throttle includes an analysis rate limiter. The analysis rate limiter holds events in an event queue, and releases the prioritized and filtered events from the event queue to the analysis engine at a defined rate. The rate may be configured by an administrator or may be based at least in part on processing capabilities of the analysis engine.

The metrics engine throttle may improve the efficiency of the metric engine by performing event batching. In event batching, the metrics engine throttle collects a set of related events, and aggregates the set of related events into a single aggregated metrics bundle which can be forwarded to the metric engine and processed. An event filter in the metrics engine throttle may filter events so that a limited number of events of a particular type are sent to the metric engine per time period. For example, the event filter in the metrics engine throttle may limit a particular event type to 1000 events per day. The metrics engine throttle includes a metric rate limiter. The metric rate limiter holds events in the event queue, and releases events to the metrics engine at a defined rate. The rate may be configured by an administrator or may be dynamically adjusted based on the available processing capability of the metrics engine.

In some examples, the processing capacity of the anomaly detection system is increased by providing a plurality of analysis engines coupled to a common event queue. The event analysis engines draw normalized events from the common event queue, process the events into metrics, and each event analysis engine stores metrics in a local cache associated with the event analysis engine. The local caches are synchronized with each other to produce a combined set of metrics usable elsewhere by the system.

FIG. 1 shows an illustrative example of an environment in which various embodiments may be practiced. An environment 100 shows a server computer system 102 that provides a service to an organization. The server computer system 102 can be a remote computing service, computer system cluster, or virtual computing environment that is hosted by the organization or by a 3rd party. The organization operates a main office 104 and a satellite office 106. The main office 104 is located at a first geolocation, and users located at the main office 104 connect to the service via a main office network. The satellite office 106 is located at a second geolocation, and users located at the satellite office 106 connect to the service via a satellite office network. A number of main office users 108, 110, 112, 114, 116, and 118, work at the main office 104. A number of satellite office users 120, 122, 124, 126, 128, and 130, work at the satellite office 106.

In the environment 100, the server computer system 102 generates logs that track the occurrence of two behavioral changes. An attacker 132 launches an attack from an attacker client computer system 134 by impersonating an authorized main office user 114. The attacker 132 accesses the service from a network address not associated with the main office network or the satellite office network. An authorized main office user 118 travels to the satellite office 106, and then connects to the service via the satellite office network.

An anomaly detection system running on the server computer system 102 allows the server computer system 102 to detect and distinguish between the actions of the attacker 132 and the actions of a relocated authorized user 130 by using a hierarchical behavioral profile. The anomaly detection system reads the logs produced by the service and extracts a collection of events. The collection of events is normalized to render event parameters into consistent formats. The event parameters are used as dimensions by which events may be partitioned, analyzed, and measured. In the example shown in FIG. 1, the server computer system 102 captures normalized events that represent service-login operations of the attacker 132 and the relocated authorized user 130.

A hierarchical behavioral profile for service-login events is maintained by the server computer system 102 in a tree structure with three levels. The leaf level comprises profiles for each user of the service, the intermediate level comprises profiles for each site of the organization, and the root level maintains a profile for the entire organization. The anomaly detection system accumulates and maintains metrics for the service-login events throughout the levels of the hierarchical behavioral profile. For example, when the server computer system 102 receives a service-login event for a particular user, a leaf-level node in the hierarchical behavioral profile is identified that corresponds to the particular user, and metrics are generated for the leaf-level node. Analysis of the event proceeds up the levels of the hierarchical behavioral profile to the root, so that metrics are updated at the office and organization levels. As a result, metrics are maintained, and behaviors are characterized, at the individual user, site, and organizational levels.

When the anomaly detection system processes the service-login event generated by the relocated authorized user 130, the anomaly detection system locates the leaf-node profile that corresponds to the relocated authorized user 130 within the hierarchical behavioral profile for service-login events. The service-login event includes dimensions that specify that the relocated authorized user 130 logged into the service from the satellite office 106, from the second geolocation, via the satellite office network. If the relocated authorized user 130 has periodically traveled to the satellite office 106, the metrics associated with the leaf-node profile will not, in general, indicate that the service-login event is an anomaly. However, if the relocated authorized user 130 has not previously traveled to the satellite office 106, the metrics associated with the leaf-node profile will indicate the service-login event is an anomaly. In an attempt to justify the anomaly, the anomaly detection system examines the parent profile of the leaf-node profile. The parent profile contains metrics associated with all users of the main office 104. If other users assigned to the main office 104 travel between the main office 104 and the satellite office 106, the parent profile will have metrics that indicate that the observed activity of the relocated authorized user 130 is not atypical. For example, metrics of the parent profile will indicate that both the main office 104 and the satellite office 106 are used by users of the main office 104. If other users assigned to the main office 104 do not travel to the satellite office 106, the parent profile will identify the service-login event from the relocated authorized user 130 as an anomaly. The anomaly detection system may justify this anomaly by examining the service-login event in the context of the root profile node. The root profile node contains metrics relating to all users in the organization, including those that work at the satellite office 106. Since the root-node profile contains metrics indicating that users of the organization work at both offices, the service-login event of the relocated authorized user 130, although anomalous at the user level and perhaps even at the office level, is not anomalous for the organization.

When the anomaly detection system processes the service-login event generated by the attacker 132, the anomaly detection system locates the leaf-node profile that corresponds to the authorized main office user 114 (the user the attacker is impersonating). The service-login event includes dimensions (or properties) that identify the originating network, geolocation, and office where the attacker 132 is located. Because these dimensions do not match those of any authorized user within the organization, the service-login event generated by the attacker 132 will not match the metrics maintained in the hierarchical behavioral profile at the user, site, or organizational level. Therefore, the service-login event will be detected as an anomaly and flagged by the system for investigation.

In this way, the anomaly detection system is able to distinguish between similar events and identify those events that are truly anomalous from those that have explanations when placed in an appropriate context. In some implementations, multiple hierarchical behavioral profiles may be used to create a combined score for an event, and the score compared to a threshold value to indicate whether the event is anomalous.

Figure 2:
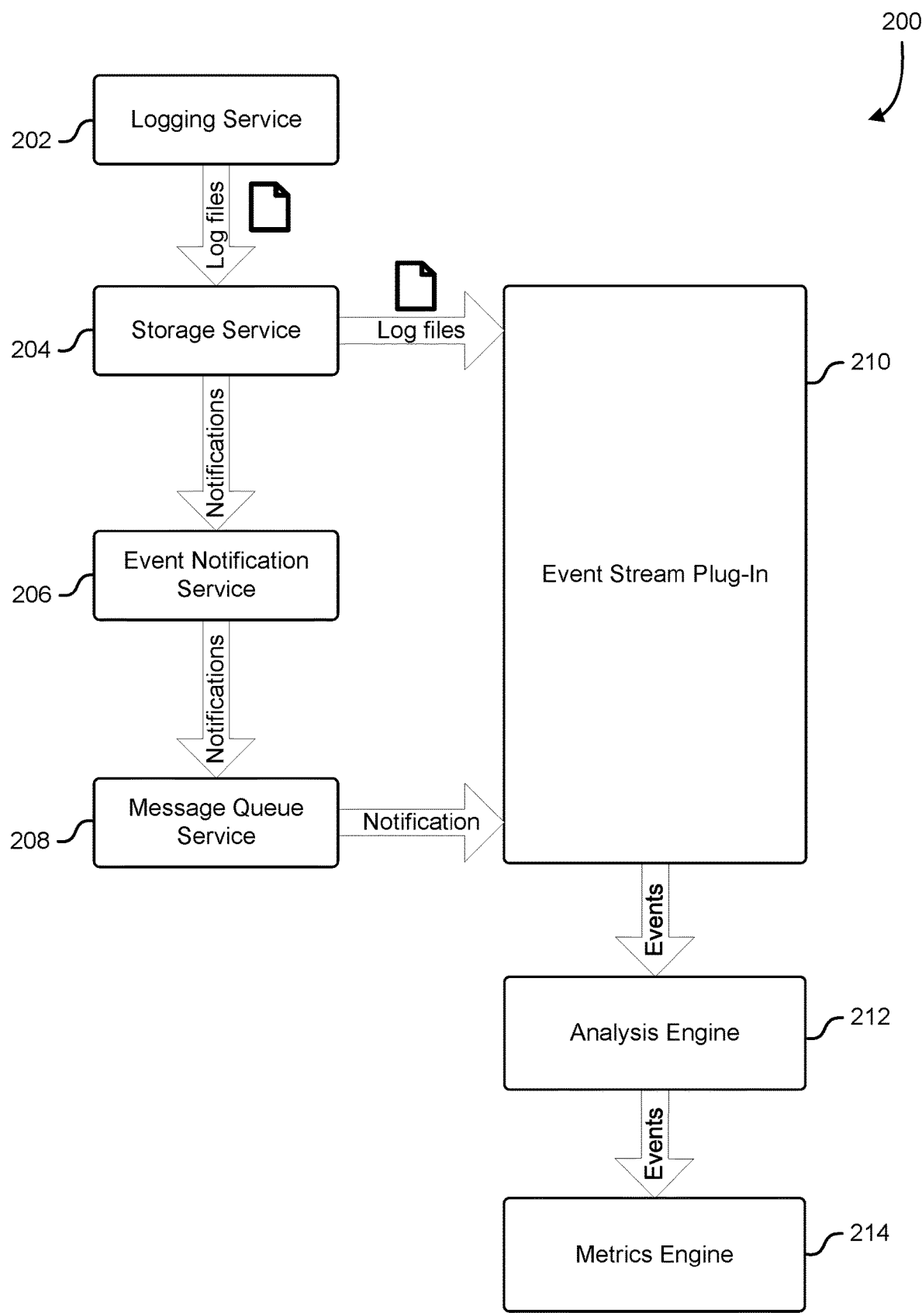
FIG. 2 shows an illustrative example of a system that converts diagnostic information extracted from a logging service into a stream of events that are processed by an analysis engine to produce various metrics.

FIG. 2 shows an illustrative example of a system that converts diagnostic information extracted from a logging service into a stream of events that are processed by an analysis engine to produce various metrics and detect anomalies. A system diagram 200 shows an event-processing pipeline that retrieves diagnostic information produced by the service and provides a stream of normalized events to an anomaly detection system. A logging service 202 generates system logs, diagnostic logs, and trace files for the service being monitored by the anomaly detection system. The log files are stored on a storage service 204. The storage service may be an online storage service, a network-connected disk drive, a network-attached storage system, or a multi-host storage system. The storage service 204 sends notifications to an event notification service 206 when log files maintained on the storage service 204 are created or updated. The event notification service 206 forwards the notifications to the message queue service 208 that is monitored by an event stream plug-in 210. The event stream plug-in 210 periodically polls the queues provided by the message queue service 208 to identify when updated log files are available from the storage service 204.

When the event stream plug-in 210 is notified by the message queue service 208 that updated log files are available, the event stream plug-in 210 retrieves the updated log files from the storage service 204. In some examples, the message queue service 208 provides information with the notifications that identify particular log files, or portions of log files to be updated by the event stream plug-in 210. The event stream plug-in 210 parses the updated log files to produce a collection of events. The collection of events are normalized by adjusting the format of each event to a form expected by an analysis engine 212. The normalized events are forwarded from the event stream plug-in 210 to the analysis engine 212 where the events are analyzed to produce a set of associated event properties and dimensions. The processed events are forwarded to a metrics engine 214, and the metrics engine 214 produces a set of metrics for the events by petitioning the events in accordance with a hierarchical behavioral profile.

Figure 3:
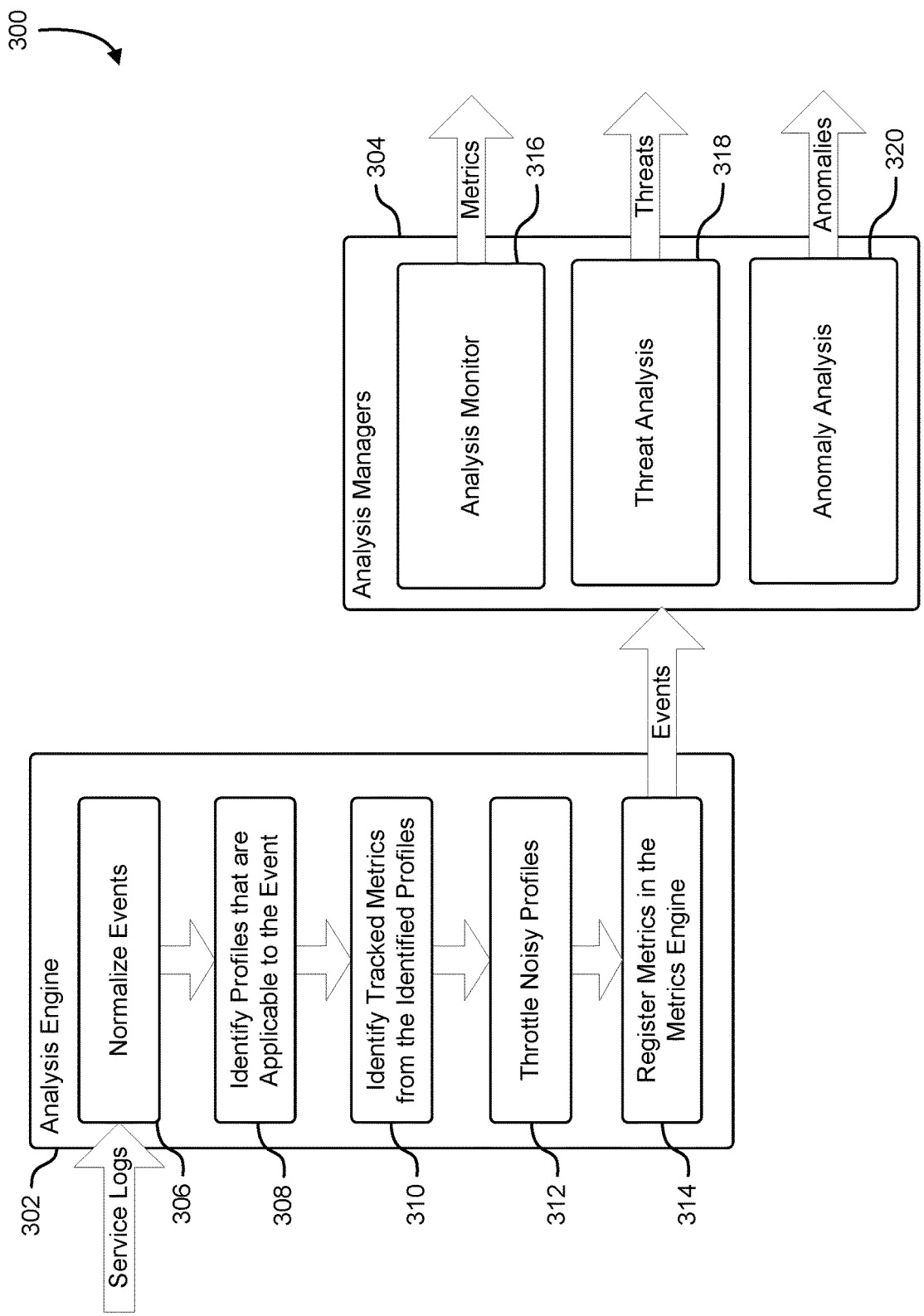
FIG. 3 shows an illustrative example of an analysis engine and analysis managers that process an event stream to identify anomalies, identify threats, and produce metrics.

FIG. 3 shows an illustrative example of an analysis engine and an analysis manager that process an event stream to identify anomalies, threats, and metrics associated with a service. A block diagram 300 shows an analysis engine 302 and a set of analysis managers 304 that operate in coordination to extract events from logs, trace files, and other event sources associated with the service. The events are processed by the analysis managers 304 to produce useful metrics, and to identify threats and anomalies within the service. The analysis engine 302 is a service within an anomaly detection system that monitors the service. The analysis engine 302 and the analysis managers 304 are services running on a computer system which monitors the operation of the service.

The analysis engine 302 takes in operational logs from a variety of sources in a variety of formats, and produces profile metrics for particular events. The analysis engine 302 acts as an integration point between various event stream plug-ins and the analysis managers 304. In some implementations, event stream plug-ins are responsible for converting incoming events or event log files into an event format expected by the analysis engine 302. The analysis managers 304 process the profile metrics to produce metrics that describe the operation of the service, identify threats to the service, and identify anomalous events that occur within the service.

The analysis engine 302 performs a number of operations to convert incoming events into profile metrics. At block 306, the analysis engine normalizes the incoming events. Events may be acquired from multiple sources in a variety of formats, and the analysis engine converts the events into a consistent format. For example, descriptive information of the event may be extracted into a formatted description field. Event parameters may be reformatted to conform to an expected date, time, currency, or numerical format. At block 308, the analysis engine 302 identifies profiles that are applicable to the event. In some implementations, profiles are identified using a metrics authority that is assigned to process incoming events from a particular event source. In another implementation, profiles are identified based on an event type. In yet another implementation, profiles are identified based at least in part on parameters provided with each event. Events that do not conform to an expected profile may be dropped or discarded. At block 310, the profiles associated with the event are analyzed to identify tracked metrics. The tracked metrics are updated based on information contained in each event using a metrics authority. In some implementations, the updated metrics are passed through an analysis throttler at block 312. The analysis throttler filters the metrics provided to the metrics engine when the rate of event production for a particular type of event exceeds a threshold value. In this way, the analysis throttler can avoid flooding the metrics engine with excessive metrics requests. At block 314, the tracked metrics are registered in a configured metrics engine, and the events are passed to the set of analysis managers 304.

The set of analysis managers 304 includes three analysis managers. An analysis monitor 316 produces metrics related to the operation of the service based on the received events. A threat analysis manager 318 identifies threats based at least in part on the particular events received. An anomaly analysis manager 320 analyzes events in the context of a hierarchical profile to identify events that represent legitimate system anomalies.

Figure 4:
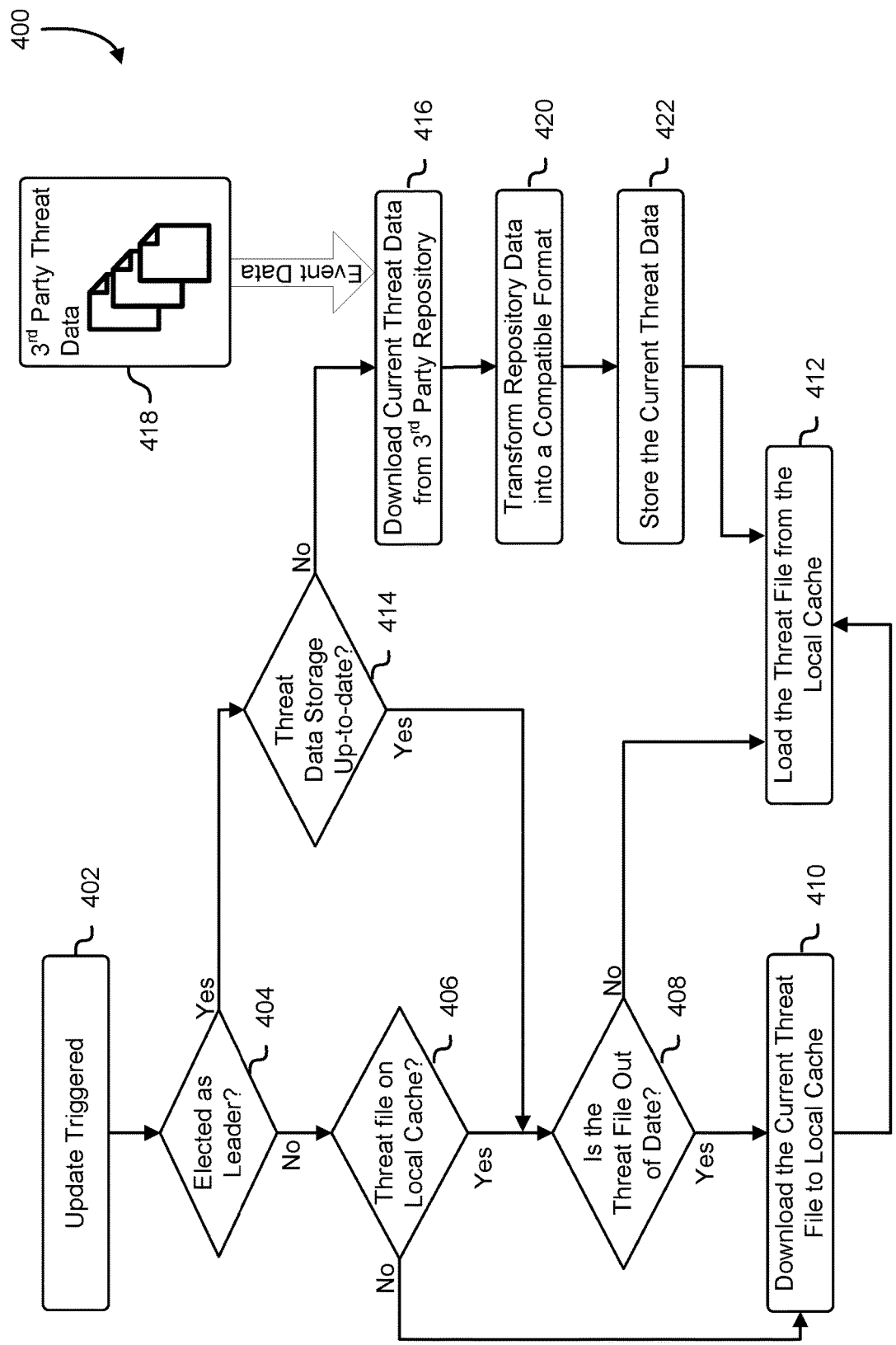
FIG. 4 shows an illustrative example of a process that, as a result of being performed by a number of analysis engines, retrieve threat information provided by 3rd party providers.

FIG. 4 shows an illustrative example of a process that, as a result of being performed by a number of analysis engines, retrieve threat information provided by 3rd party providers. A process diagram 400 illustrates a process that begins at block 402 with an analysis engine receiving a request to update threat information maintained by the analysis engine. The update request may be in the form of a triggering event, a periodic trigger, or a notification from a 3rd party that updated threat information is available. At decision block 404, the analysis engine participates in an election process with other analysis engines to determine a leader. In some implementations, a probabilistic mechanism is used to select a number of leaders. Each analysis engine generates a random number between zero and one. If, for a particular analysis engine, the randomly generated number is less than one divided by the number of analysis engines, the particular analysis engine is selected as a leader. During some update cycles no leaders may be elected, or more than one leader may be elected.

If the analysis engine is not elected as a leader, execution proceeds to decision block 406 and the analysis engine determines whether a threat file is available on a local cache. If the threat file is available on the local cache, the analysis engine determines 408 whether the threat file is out of date. If the threat file is out of date, or if the threat file is not on the local cache, the analysis engine downloads the threat file from shared storage to the local cache. The shared storage is a storage location accessible to the analysis engines that participate in leader election. The shared storage may be implemented using network attached storage, an online storage service, or a multi-host storage system. After the current threat file is downloaded to the local cache at block 410, or if the existing file on the local cache is not out of date, the analysis engine loads the threat file from the local cache into the analysis engine for use in determining threats to the service.

If the analysis engine is elected as a leader, then the analysis engine performs operations to retrieve updated information from third-party threat data providers. At decision block 414, the analysis engine examines the threat data stored in the shared storage. If the threat data is up-to-date, the analysis engine does not update the threat data, and proceeds to decision block 408 to update the analysis engine's local cache. If the threat data is not up-to-date, the analysis engine downloads 416 current threat data from a number of third-party threat data providers 418. The threat data can include blacklisted IP addresses and networks, known hostile websites, anonymous network endpoints, and geographic information describing the source of known attacks. At block 420, the analysis engine transforms their posture data into a format used by the analysis engine. For example, the analysis engine converts IP address lists, URLs, and threat information from multiple threat data providers into a single common format. At block 422, the analysis engine stores the updated and formatted threat data to the shared store so that the threat data is accessible to other analysis engines. The local cache on the lead analysis engine is updated, and at block 412, threat data from the local cache is loaded into the analysis engine for use and identifying threats to the service.

The analysis engine may use threat data that includes GeoIP mapping data, network metadata, anonymous network exit nodes, and malicious IP address lists from various third-party providers. The threat data is cached both on a shared store as well as each analysis engine's local cache. When an update is triggered, an analysis engine is elected as a leader to manage synchronizing the cached data with the third-party threat data providers. Non-leader analysis engines sync the data on their local cache with the content of the shared store.

Figure 5:
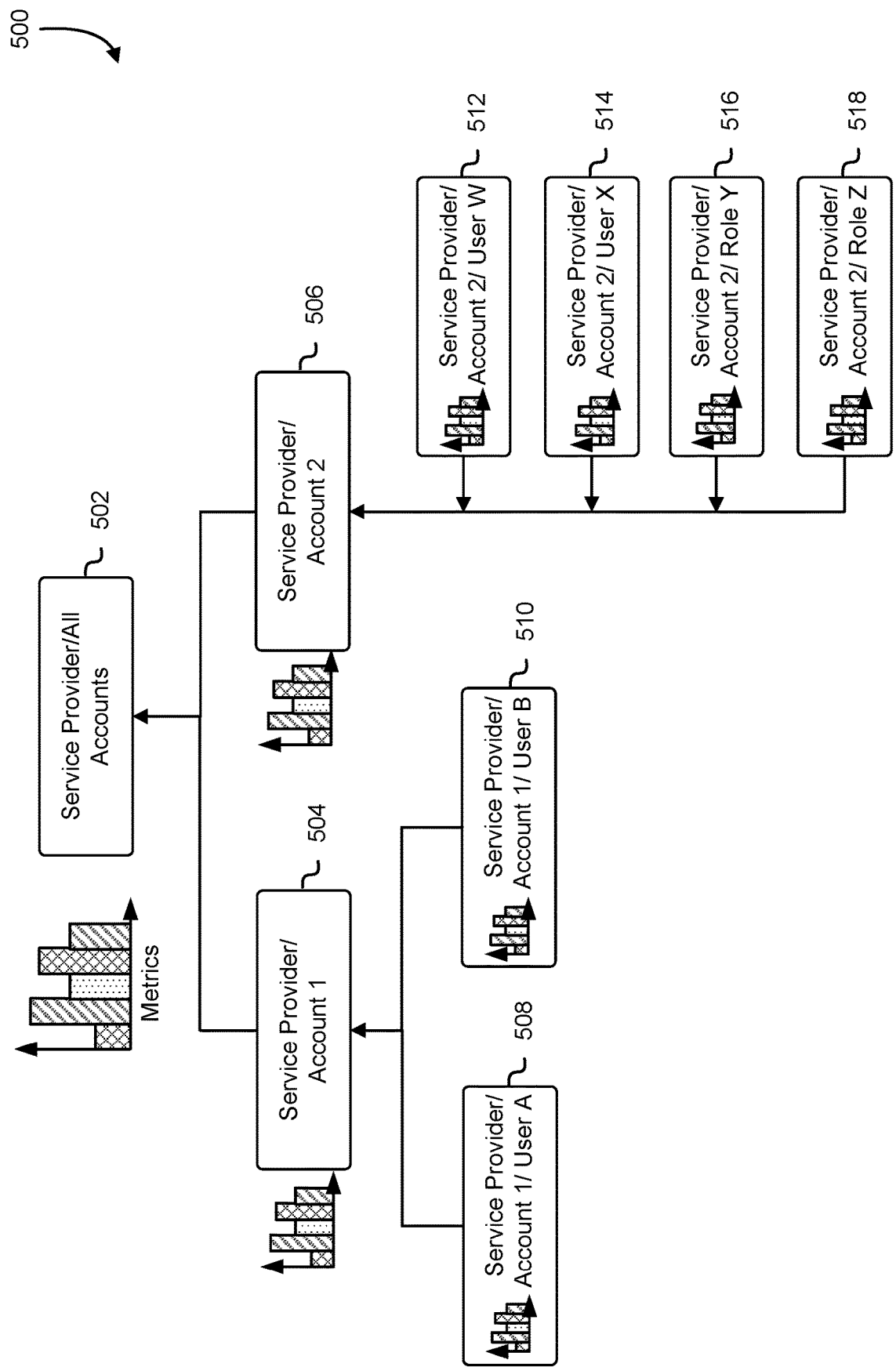
FIG. 5 shows an illustrative example of a hierarchical profile for processing an event stream into metrics.

FIG. 5 shows an illustrative example of a hierarchical profile for processing an event stream into metrics. A data diagram 500 shows a hierarchical profile in a tree structure with three levels. A root level profile 502 identifies tracked metrics that are aggregated at the level of the service being monitored. The root level profile 502 is linked to two account profiles. A first account profile 504 identifies tracked metrics that are aggregated at the account level, and associated with a first account. A second account profile 506 identifies tracked metrics that are associated with a second account. Two leaf profiles are linked to the first account profile 504. A first user profile 508 identifies tracked metrics that are associated with a first user of the first account, and a second user profile 510 identifies tracked metrics that are associated with a second user of the first account. Four leaf profiles are linked to the second account profile 506. Two of the four leaf nodes define profiles associated with users of the second account. A first user profile 512 identifies tracked metrics that are associated with a first user of the second account, and a second user profile 514 identifies tracked metrics that are associated with a second user of the second account. The remaining two profiles are associated with account roles of the second account. Roles may be assigned to users, and each role defines a set of service-access rights and privileges that can be granted to users or other roles. A first role profile 516 identifies tracked metrics that are associated with a first role, and a second role profile 518 identifies tracked metrics that are associated with a second role.

As events are processed by an analysis engine, the analysis engine uses the hierarchical profile to identify tracked metrics that are associated with each event. For example, if the analysis engine receives a service-login event that identifies, in a dimension of the event, the first user of account one, the analysis engine identifies the first user profile 508, the first account profile 504, and the root level profile 502 as identifying tracked metrics to be updated using the information received with the service-login event. In various implementations, the first user profile 508 identifies a tracked metric that records the IP addresses from which the first user has logged in. The first account profile 504 identifies a tracked metric that records the networks from which all users under the account have connected. The root level profile 502 identifies a tracked metric that records failed login attempts at the service level.

In various implementations, metrics are registered with a metrics engine, which maintains and updates the metrics in accordance with applicable events. The metrics engine may maintain the following properties for each metric: a scope of the metric, a date, a metric count, a metric name, a profile associated with the metric, a metric type, and a metric date. The metrics engine may record additional values that are extracted from the dimensions of the events received, including metrics based at least in part on those dimensions. Analysis managers may produce additional metrics that are tracked by the metrics engine. For example, if an anomaly analysis identifies an anomalous event, the metrics engine may record an anomaly level, type, threat level, and threat type for the anomalous event.

In some implementations, a hierarchical behavioral profile is processed by a metrics authority to produce metrics at each level of the profile. In one example, the metrics authority defines three profile levels of (1) the entire service, (2) a particular account identified by an identityPool dimension, and (3) a particular user/role of an account identified by a pair of identityPool and identityKey dimensions. The following is a sample list of how hierarchical metrics can be captured for such events:
[identityPool]
[identityPool, identityKey]
[userAgent]
[identityPool, userAgent]
[identityPool, identityKey, userAgent]
[originNetwork]
[identityPool, originNetwork]
[identityPool, identityKey, originNetwork]
[originIsp]
[identityPool, originIsp]
[identityPool, identityKey, originIsp].

If the analysis engine ingests an event such as the one below.
{
  "eventVersion": "1.02",
  "userIdentity": {
    "type": "User",
    "principalId": "AIDAJGZWTUHSCJKFHQ6Y4",
    "arn": "arn:svc:iam::165387595752:user/engine-prod",
    "accountId": "165387595752",
    "accessKeyId": "AKIAISUB6K3Z5LWZLCEA", "userName": "engine-prod"
"eventTime": "2016-01-13T00:03:52Z",
"eventSource": "sts.service.com",
"eventName": "AssumeRole",
"svcRegion": "us-east-1",
"sourceIPAddress": "72.21.217.70",
"userAgent": "svc-internal/3",
"requestParameters": {
"roleArn": "arn:svc:iam::726756523438:role/LogsReadOnly-InfoSec",
"roleSessionName": "ANALYSISMGR",
"durationSeconds": 900
}
. . .
}

The following metrics are registered in the metrics engine (omitting the internal dimensions for clarity):
[identityPool="165387595752"]
[identityPool="165387595752", identityKey="arn:svc:iam::165387595752:user/engine-prod"]
[userAgent="svc-internal/3"]
[identityPool="165387595752", userAgent="svc-internal/3"]
[identityPool="165387595752", identityKey="arn:svc:iam::165387595752:user/engine-prod", userAgent="svc-internal/3"]
[originNetwork="internal"]
[identityPool="165387595752", originNetwork="internal"]
[identityPool="165387595752", identityKey="arn:svc:iam::165387595752:user/engine-prod", originNetwork="internal"]
[originCountry="US"]
[identityPool="165387595752", originCountry="US"]
[identityPool="165387595752", identityKey="arn:svc:iam::165387595752:user/engine-prod", originCountry="US"]
. . .

FIG. 5 shows a visualization of a similar hierarchical profile for a service provider. If a metric has already been registered in the metrics engine for the current period, then the MetricCount dimension (one of the internal dimensions) is incremented. The period may be a day, an hour, or other amount of time used for refreshing metrics. Metrics may be prefixed with a set of internal dimensions.

Figure 6:
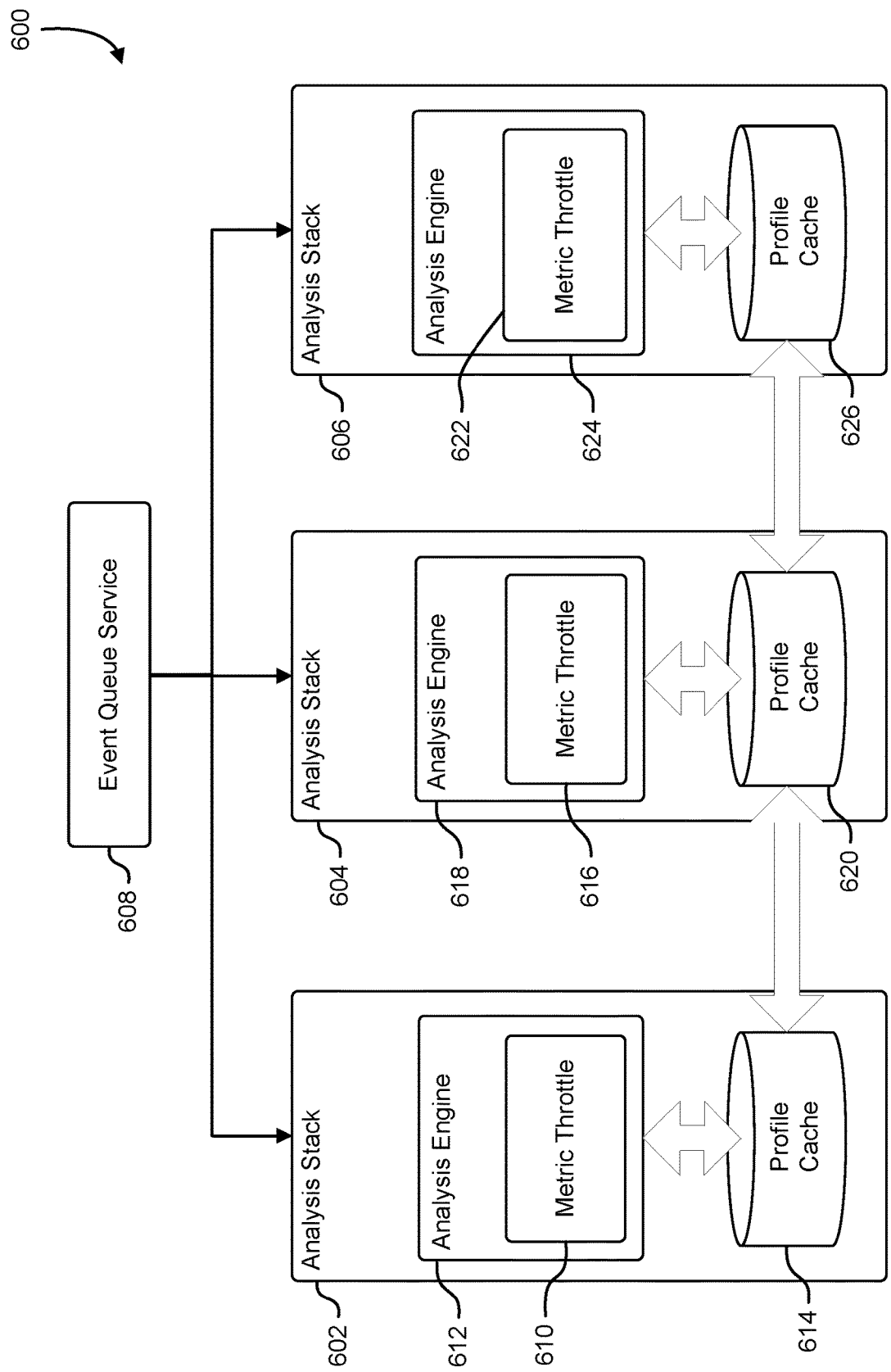
FIG. 6 shows an illustrative example of a system that uses multiple analysis stacks to process events into anomalies, threats, and metrics.

FIG. 6 shows an illustrative example of a system that uses multiple analysis stacks to process events into anomalies, threats, and metrics. In some examples, events are received by the analysis engine that include an arbitrary number of dimensions. As a result, a correspondingly arbitrary number of metrics may be generated from such events, thereby placing considerable load on the system. In order to improve the ability of the analysis engine to process incoming events, the incoming events may be transformed into events having the finite number of dimensions. In addition, the generation of new metrics may be controlled by a throttling system.

A system diagram 600 includes a first analysis stack 602, a second analysis stack 604, and a third analysis stack 606 that draw events from an event queue service 608. By drawing events from the event queue service 608, the analysis stacks are able to load share the task of processing incoming service events. Additional analysis stacks may be added in response to increasing load by connecting the additional analysis stacks to the existing event queue service.

In some examples, operation of each analysis engine can be controlled in part by a throttling service. In FIG. 6, a first analysis engine 612 has a first metric throttle 610, a second analysis engine 618 has a second metric throttle 616, and a third analysis engine 624 has a third metric throttle 622. Noisy metrics that are frequently updated may be throttled by the associated metric throttle when the metrics are updated or written so as not to overwhelm a metrics engine associated with the analysis engines. In some examples, throttling is to be applied on metric registration. Throttling changes the rate of the updates to the metrics by the metrics engine, but not the operation of the analysis engine, and incoming events are not permanently lost.

Each analysis stack processes a subset of the events from the event queue service 608 and stores the results in a local profile cache. The first analysis stack 602 stores results in a first profile cache 614, the second analysis stack 604 stores results in a second profile cache 620, and the third analysis stack 606 stores results in a third profile cache 626. The profile caches that are associated with the analysis stacks are synchronized with each other periodically so that each analysis stack has access to up-to-date profiles that can be used to process new events.

Figure 7:
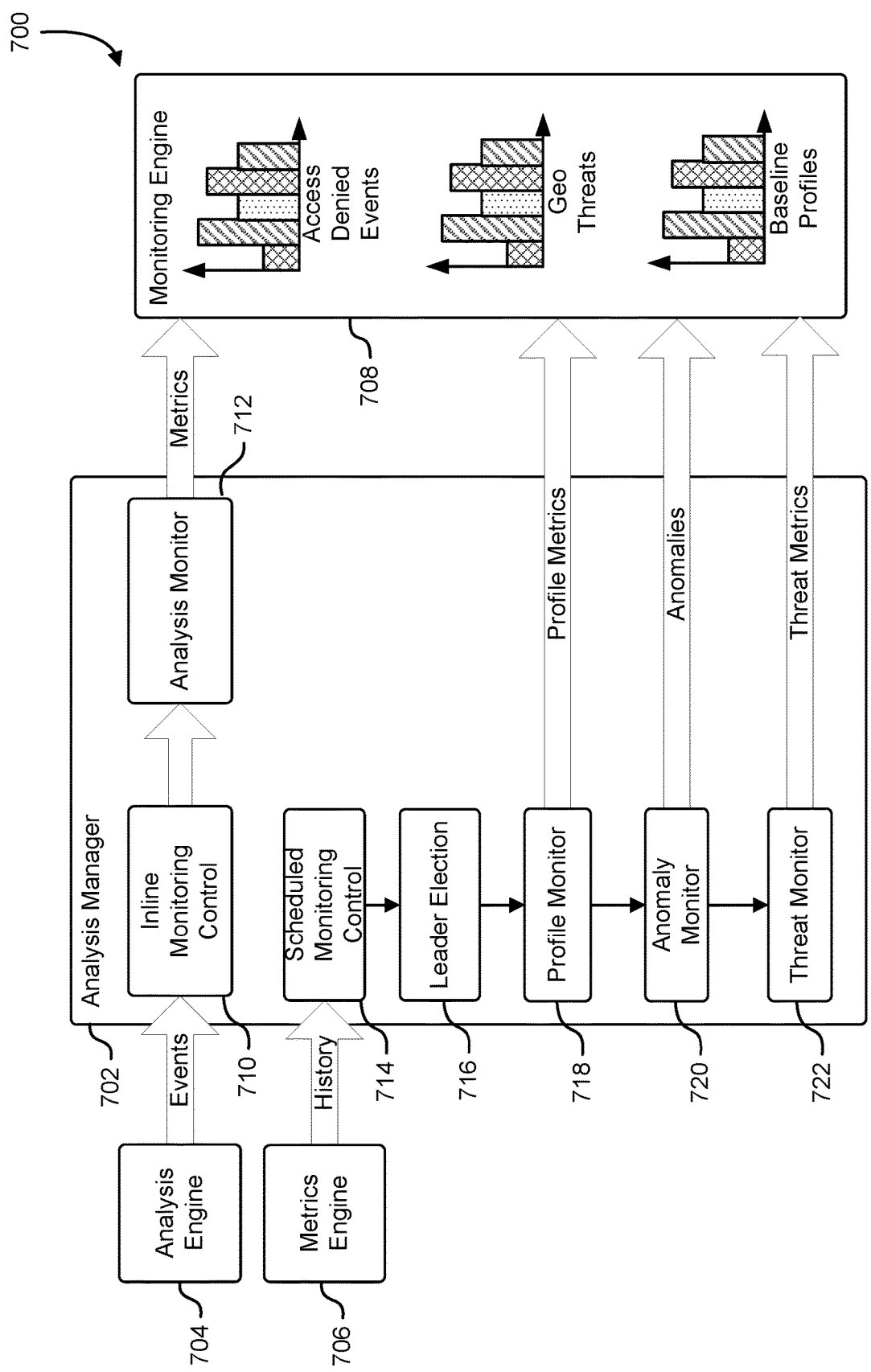
FIG. 7 shows an illustrative example of an analysis manager that analyzes normalized events, event metrics, and metric histories to identify threats.

FIG. 7 shows an illustrative example of an analysis manager that analyzes normalized events, event metrics, and metric histories to identify threats. A system diagram 700 shows a structure of an analysis manager 702. The analysis manager 702 receives events from an analysis engine 704 and metrics from a metrics engine 706. The analysis manager 702 processes the events and metrics to produce metrics, and identify anomalies and threats, which are sent to a monitoring engine 708. The monitoring engine 708 is an administrative console that collects and displays metrics to system administrators and other authorized users.

The analysis manager 702 processes events and metrics into pipelines. The first pipeline is controlled by an in-line monitoring control 710. The in-line monitoring control 710 processes events as they are received by the analysis manager 702, and sends the events to an analysis monitor 712. The analysis monitor 712 converts the event stream to a series of metrics that are forwarded to the monitoring engine 708. The second pipeline is controlled by a scheduled monitoring control 714. Historical metrics and events are collected and periodically processed by the analysis manager 702.

When the scheduled monitoring control 714 triggers an analysis cycle, the analysis manager 702 performs a process that results in the identification of threats and anomalies. Leader election logic 716 coordinates the selection of the lead analysis manager if more than one analysis manager is present in the system. The lead analysis manager updates threat information used by the analysis managers to identify threats. The process of selecting a lead analysis manager may be accomplished using the process shown in FIG. 4. A profile monitor 718 generates metrics that are based at least in part on the profiles themselves. For example, the profile monitor 718 may produce metrics such as the number unique profiles matcher per processing period, or the number of access-denied profiles matched per day. An anomaly manager 720 analyzes the events provided by the analysis engine 704 in the context of the metrics provided by the metrics engine 706 to identify events that indicate anomalous behavior of the service being monitored. The identified anomalies are provided to the monitoring engine 708 for presentation to an administrator. A threat monitor 722 uses threat information provided by third parties to identify events that represent a threat to the service. For example, the threat monitor uses a database of blacklisted IP addresses to identify events originating from the blacklisted IP addresses, and flags the events as threats. The identified threats are sent to the monitoring engine 708 for presentation to an administrator.

Figure 8:
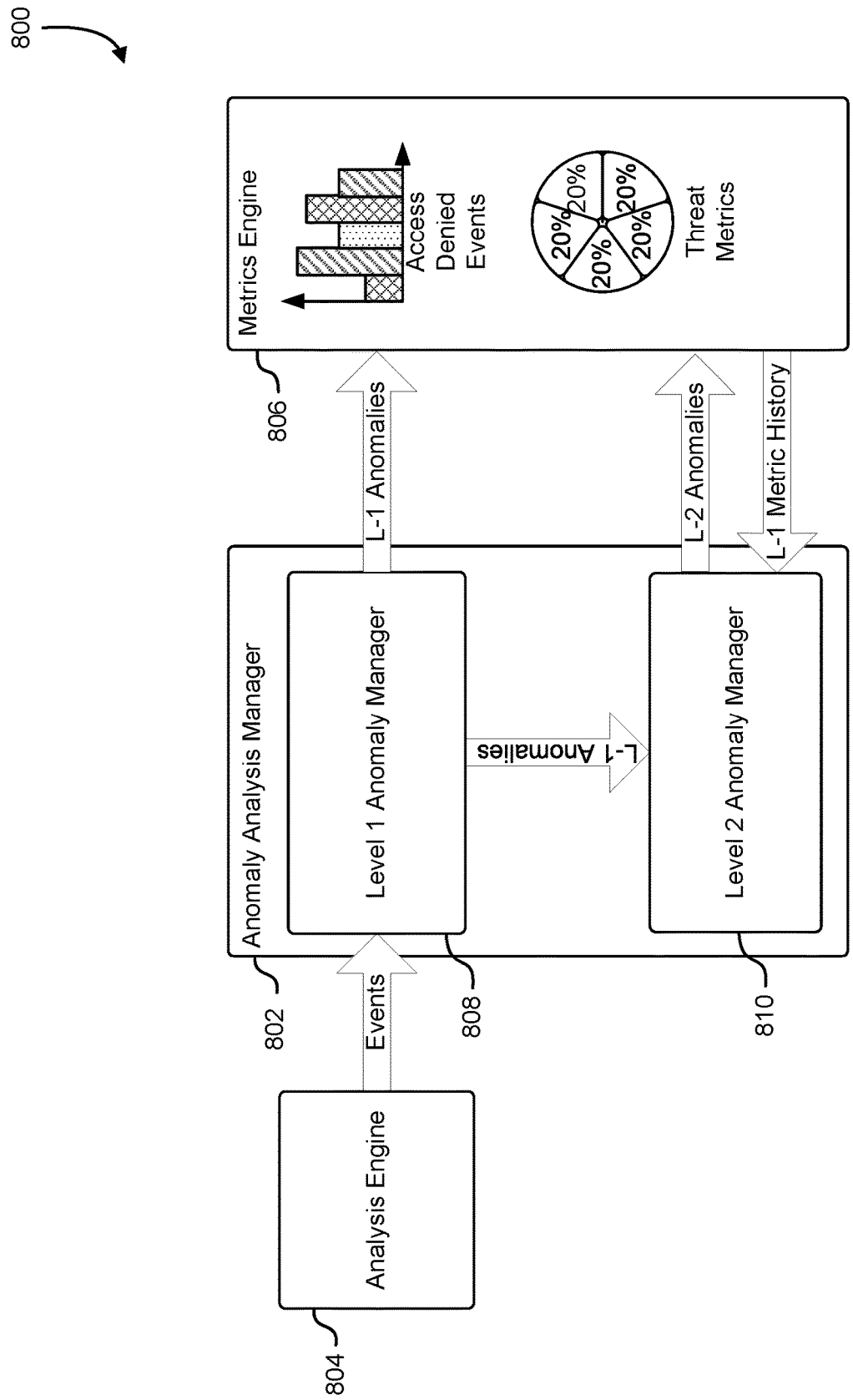
FIG. 8 shows an illustrative example of an anomaly analysis manager that identifies anomalies from a stream of normalized events and historical metrics.

FIG. 8 shows an illustrative example of an anomaly analysis manager that identifies anomalies from a stream of normalized events and historical metrics. A diagram 800 includes an anomaly analysis manager 802 that receives events from an analysis engine 804. The anomaly analysis manager 802 includes a first-level anomaly manager 808 and a second-level anomaly manager 810. The first-level anomaly manager 808 identifies events that qualify as anomalies within the service being monitored, and provides the identified anomalies to a metrics engine 806. The second-level anomaly manager 810 processes the identified anomalies in the context of existing metrics to provide increased detection accuracy and rejection of false positive anomalies.

The anomaly analysis manager 802 implements a two-level anomaly management mechanism. The first-level anomaly manager 808 performs two tasks: (1) identifying point anomalies by comparing an ingested event to known metrics in the ingested event's corresponding profile, and (2) assigning a level of confidence to the identified anomaly. The result of the first level of analysis is registered in the metrics engine 806 in association with the profile corresponding to the event. If the level of confidence is above a threshold value configured by an administrator, a second level of anomaly analysis is triggered. The second level of anomaly analysis focuses on in-depth statistical analysis of profiles. The first-level anomaly manager 808 triggers level two analysis by the second-level anomaly manager 810 based at least in part on identified point anomalies. In some examples, second-level analysis of anomalies may be triggered by a scheduled scan of the profiles. The second-level anomaly manager 810 looks for a particular level of deviation in the number of point anomalies registered for each profile. The level of allowed deviation is suggested so that non-malicious point anomalies, also known as concept drifts, are not determined to be malicious anomalies. In general, such non-malicious point anomalies are the result of a legitimate change in user or service behavior.

In some examples, the first-level anomaly manager 808 inquires, from a configured metrics authority, a list of target metrics for the given event metric. The target metrics that are within a configured sliding time window are retrieved from a metrics engine, and a list of anomalous metrics that do not have a corresponding historical match in the metrics engine are created. The first-level anomaly manager 808 determines the weight of each target metric from the configured metrics authority, applies weight adjustments, and calculates an aggregated anomaly level for the analyzed event. The weight of the anomalous metrics is adjusted as each metric is processed by a chain of weight analysts. Each weight analyst returns an adjustment value in the range of [0, 1] and the average of these adjustment values is applied to the default metric weight. The weight adjustment chain may include three analytic components:

1. Vertical Weight Analyst: The vertical weight analyst traverses up the anomalous metric's profile chain and determines if the anomalous metric is expected based at least in part on the metric's parent profiles. Based at least in part on the level of the hierarchical profile that a match is found, an adjustment value is returned. In some examples, the adjustment value is a value of (1.0/L-1) where L is the parent profile distance from the anomalous metric (L is negative higher in the hierarchy). The number of hierarchy levels to traverse is configured based at least in part on the partitioning of the levels of the hierarchical profile. In one example, the vertical weight analyst is configured for Level-1 analysis to traverse up the hierarchy to account-level profiles and verify if the observed anomaly for a given user/role is observed in any other user/roles in the same account.

2. Horizontal Weight Analyst: The horizontal weight analyst traverses the profiles at a given profile chain level and determines the number of profiles containing the anomalous metric. Based on the number of profiles containing the anomalous metric, an adjustment value is returned. In some examples, the adjustment value is of the form (X/Y)*Z, where X is the number of profiles determined, Y is the number of profiles at the given profile chain level, and Z is the adjustment factor. In one example, the horizontal weight analyst, when configured for Level-0 (the leaf level of the profile hierarchy), probes how many other users/roles (in any account) have observed a given anomalous metric. If the horizontal weight analyst is configured for Level-1, the horizontal weight analyst determines how many other accounts (any of the associated user/roles) have observed the given anomalous metric.

3. Recurrence Weight Analyst: The recurrence weight analyst returns a weight adjustment factor based at least in part on recent occurrences of the anomaly type for the given anomaly metric within the analysis sliding time window. To determine the adjustment factor, the recurrence weight analyst uses an activity calculator as described below.

After the anomalous metric weights are adjusted, a triage analyst calculates an aggregated anomaly level for the given event, according to the following:

$$AnomalyLevel = ConfidenceFactor * SQRT[AW(AM.1)^2 + AW(AM.2)^2 + \ldots + AW(AM.X)^2] / SQRT[W(TM.1)^2 + W(TM.2)^2 + \ldots + W(TM.Y)^2]$$

Where:
AW is the adjusted weight for a given metric,
AM.n is the n-th anomalous metric,
X is the total number of anomalous metrics,
W is the default weight for a given metric,
TM.n is the n-th target metric,
Y is the total number of extracted target metrics,
Z is the total number of possible target metrics, and
ConfidenceFactor is an aggregated adjustment factor calculated by a number of anomaly confidence analysts.

In various examples, a number of methods may be used to determine the confidence factor. A target-confidence method determines a confidence factor based at least in part on the number of metrics extracted from a given event and the maximum number of possible metrics for each event:

$$ConfidenceFactor = [W(TM.1) + W(TM.2) + \ldots + W(TM.Y)] / [W(TM.1) + W(TM.2) + \ldots + W(TM.Z)]$$

An activity-confidence method extracts the data points that are available for a given profile within a configured time period and sends that information to an activity calculator to generate a confidence factor. An activity calculator may determine a confidence factor in a number of ways. In some examples, the confidence factor is determined as follows:
NaiveActivityCalculator(datapoints):
activeDays=DoubleStream.of(datapoints).filter(d-> (d!=0)).count( );
ConfidenceFactor=Fraction.getFraction(min(activeDays, idealActiveDatapoints), idealActiveDatapoints).

In another example, the confidence factor is determined as follows:

```
WeightedActivityCalculator(datapoints):
  idealWeightedActivityScore = calculate
  SquaresSum(datapoints.length -
  idealActiveDatapoints, datapoints.length);
  observedWeightedActivity Score = 0;
  for (i = datapoints.length - 1; i >= 0; i--) {
    if (datapoints[i] != 0) {
      observedWeightedActivity Score += Math.pow(i + 1, 2);
      if (observedWeightedActivityScore >=
      idealWeightedActivityScore) {
        observedWeightedActivityScore =
        idealWeightedActivityScore;
        break;
      }
    }
  }
ConfidenceFactor = Fraction.getFraction(observedWeightedActivityScore,
idealWeightedActivityScore).
```

If the calculated anomaly level is within the range of 0 to 1, an anomaly level classification is assigned as follows:
[0.80,1] maps to ANOMALY_LEVEL.HIGH,
[0.5, 0.80) maps to ANOMALY_LEVEL.MEDIUM, and
(0, 0.5) maps to ANOMALY_LEVEL.LOW.

If the triage analyst returns an anomaly level of ANOMALY_LEVEL.LOW or higher, then the first-level anomaly manager 808 passes the event through a set of anomaly triage responders. Examples of anomaly triage responders include an anomaly triage registrar and an anomaly triage publisher. The anomaly triage registrar is a responder that is responsible for registering tracked metrics corresponding to an event with anomalous metrics in the metrics engine. The tracked metrics allow the second-level anomaly manager 810 to investigate the collective anomaly of each profile. The anomaly triage publisher sends a message to the second-level anomaly manager 810 that initiates a collective anomaly analysis on the profile when an event contains an anomalous metric with an anomaly level greater than ANOMALY_LEVEL.LOW. The anomaly triage publisher ensures that second-level anomaly analysis is not triggered unless sufficient data is available in the metrics engine, and that redundant hints do not overload the second-level anomaly manager 810.

Figure 9:
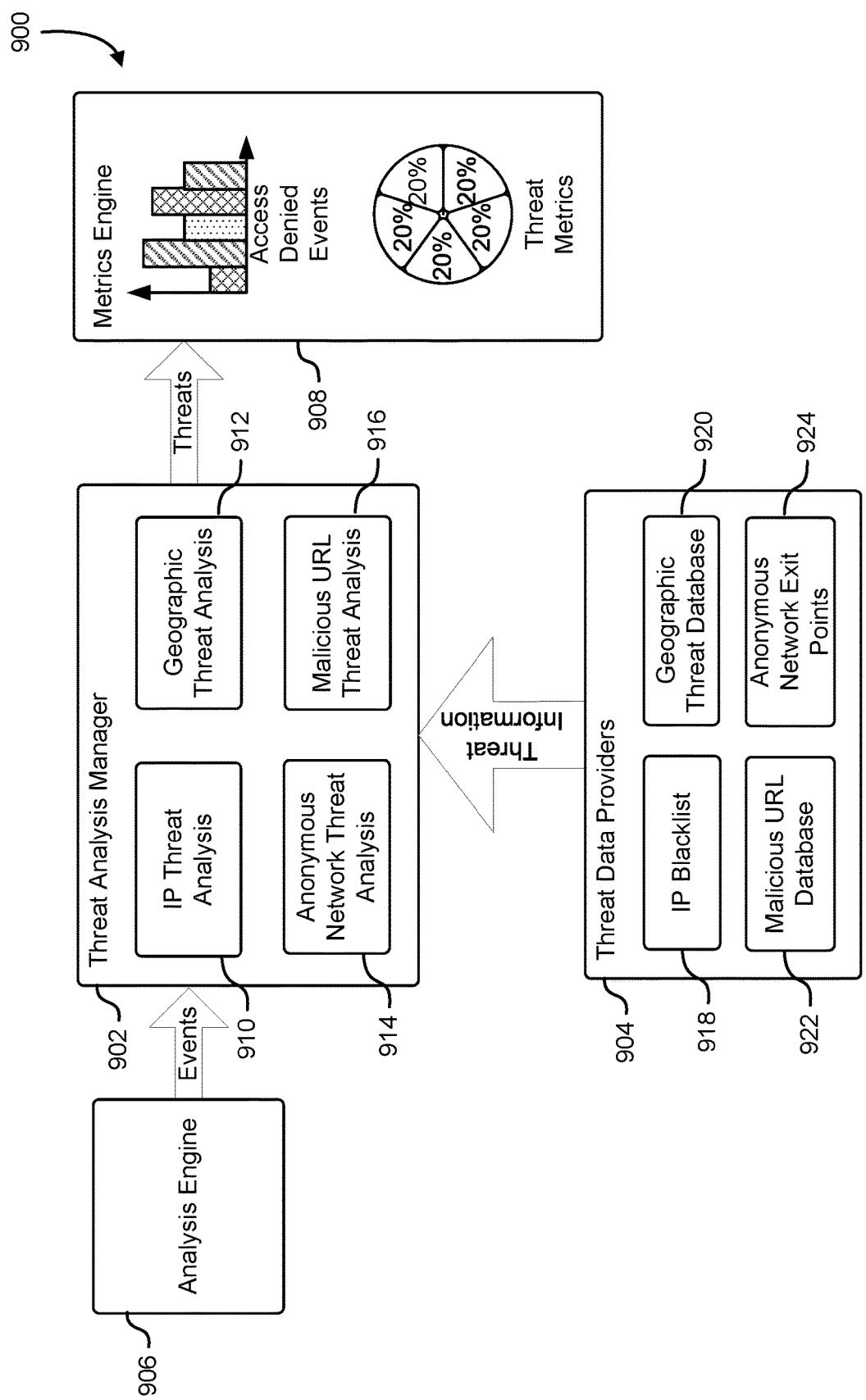
FIG. 9 shows an illustrative example of a threat analysis manager that identifies threats based at least in part on threat data provided by a number of threat data providers.

FIG. 9 shows an illustrative example of a threat analysis manager that identifies threats based at least in part on threat information provided by a number of threat data providers. To boost the system's anomaly analysis confidence, a threat analysis mechanism is implemented to tap into sources of threat information and provide a threat score for received events. In some examples, these threats are an indicator of a security breach. The anomaly analysis layer is configured to pick up and report events corresponding to likely threats. For example, in some situations, it is not expected that a user ID associated with an internal service be used through an anonymous network such as the Tor network. An anomaly analysis layer identifies if a threat type or threat level is expected or unexpected in a particular context.

A system diagram 900 includes a set of threat analysis managers 902 that use threat information provided by a set of threat data providers 904 to identify threats to a monitored service. The identified threats are forwarded to a metrics engine 908. The threat analysis manager 902 includes an IP threat analysis manager 910, a geographic threat analysis manager 912, an anonymous network threat analysis manager 914, and a malicious URL threat analysis manager 916. The analysis managers in the set of threat analysis managers 902 received threat information from corresponding threat data providers in the set of threat data providers 904. The set of threat data providers 904 comprises an IP blacklist 918, a geographic database 920, the malicious URL database 922, and an anonymous network exit point database 924. In some implementations, the information from the set of threat data providers 904 may be synchronized with and distributed across a number of threat analysis managers.

Each analysis manager in the set of threat analysis managers 902 examines each event provided by the analysis engine 906 and determines, using the threat information provided by the corresponding threat data provider in the set of threat data providers 904, whether the particular event represents a threat to the service.

Figure 10:
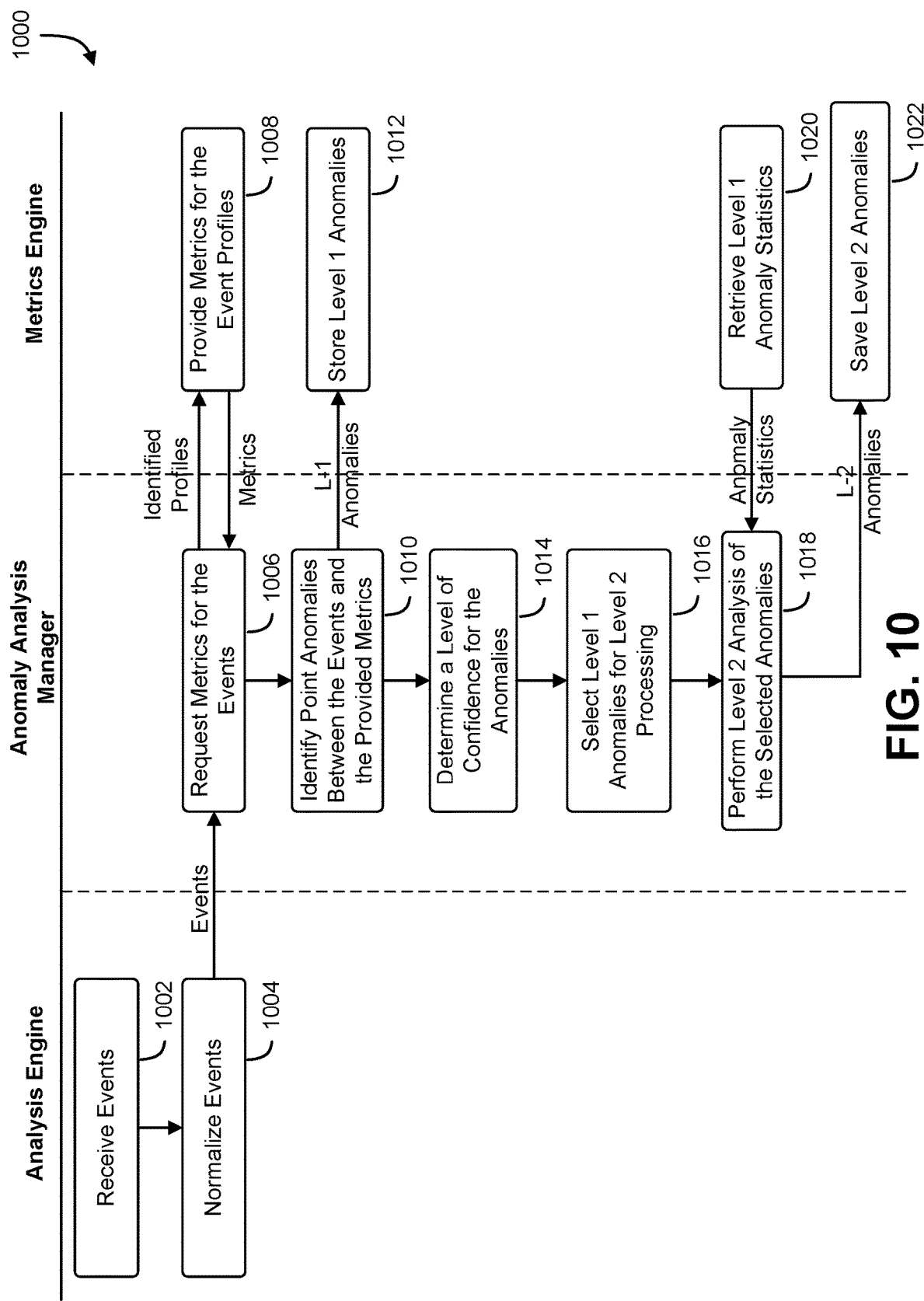
FIG. 10 shows an illustrative example of a process that, as a result of being performed by an analysis engine, an anomaly analysis manager, and a metrics engine, identifies anomalies from a stream of normalized events and historical metrics.

FIG. 10 shows an illustrative example of process that, as a result of being performed by an analysis engine, an anomaly analysis manager, and a metrics engine, identifies anomalies from a stream of normalized events and historical metrics. A swim diagram 1000 shows a process that identifies anomalies based at least in part on a stream of incoming events. At block 1002, the analysis engine receives events from the service being monitored. The events may be received from log files, trace files, or other event sources associated with services or computer systems of the service being monitored. At block 1004, the analysis engine normalizes the received events. Events received from different sources are transformed into a common format established by the analysis engine so that the events can be processed with a common pipeline through the anomaly analysis manager. The events are passed from the analysis engine to the anomaly analysis manager.

At block 1006, the anomaly analysis manager receives the normalized events. The anomaly analysis manager identifies the profiles associated with the received events, and requests, from the metrics engine, metrics associated with the identified profiles. The metrics engine, in response to the request, provides 1008 the requested metrics to the anomaly analysis manager. The anomaly analysis manager compares the received events to the metrics in the identified profile to identify 1010 point anomalies. Point anomalies are events which differ from expected behavior determined based at least in part on the historical metrics of the profile. The anomaly analysis manager sends the identified point anomalies, also called Level One (L-1) anomalies, to the metrics engine. The metrics engine retains 1012 the Level One anomalies in the corresponding event profile.

At block 1014, the anomaly analysis manager determines the level of confidence for the identified Level One abnormalities. Level of confidence may be determined as described above. For example, the level of confidence may be based at least in part on a level of statistical matching of the dimensions of the event against corresponding metrics at various levels and the corresponding hierarchical profile. At block 1016, if the anomaly analysis manager determines that the level of confidence for a particular identified Level One anomaly exceeds a threshold level, then the anomaly analysis manager performs a second-level analysis for the particular Level One anomaly. At block 1018, the anomaly analysis manager performs second-level analysis on those Level One anomalies having a confidence level exceeds a configured threshold. The second-level analysis performs a statistical analysis using Level One anomaly statistics provided 1020 by the metrics engine. The identified second-level anomalies are forwarded to the metrics engine and the metrics engine stores 1022 the second-level anomalies.

Figure 11:
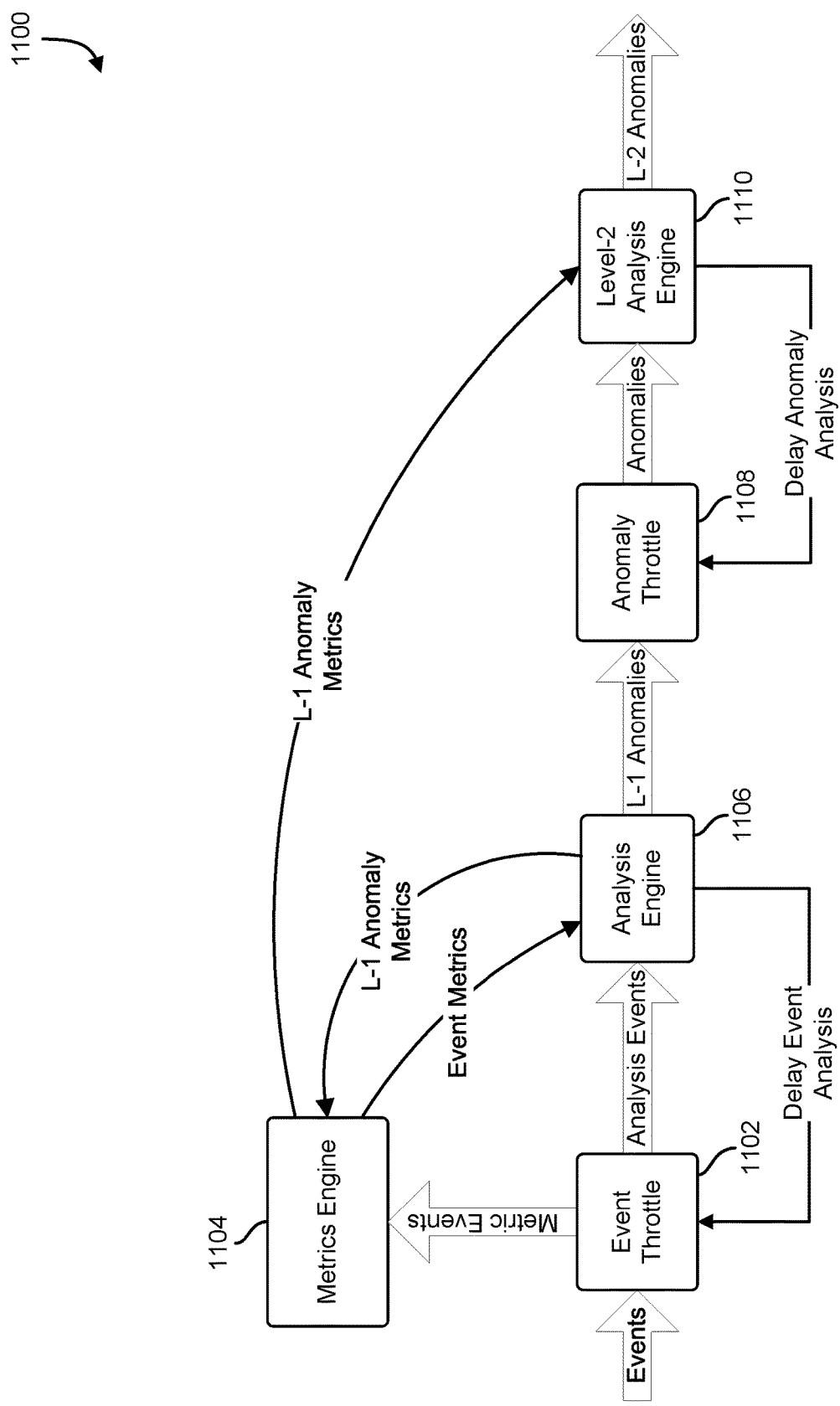
FIG. 11 shows an illustrative example of an event-analysis system that controls the flow of events to an analysis engine and a metrics engine.

FIG. 11 shows an illustrative example of an event-analysis system that controls the flow of events to an analysis engine and a metrics engine. A block diagram 1100 includes an event throttle 1102 that receives events from a service being monitored. The event throttle 1102 generates and outputs two event streams. An event stream of metric events is provided to a metrics engine 1104, and an event stream of analysis events is provided to an analysis engine 1106.

The stream of metric events comprises some or all of the events received by the event throttle 1102 from the service being monitored. In generating the stream of metric events, the event throttle 1102 may filter some events from the events received by the event throttle. In addition, the event throttle 1102 may alter the sequence of the events provided to the metrics engine 1104. The event throttle 1102 controls the rate at which events are provided to the metrics engine 1104 to improve the operation of the event-analysis system by limiting the amount of computing resources consumed by the metrics engine 1104. In some implementations, the event throttle 1102 monitors the computational load on the metrics engine 1104 and alters the rate at which events are provided to the metrics engine 1104 based at least in part on the availability of computing resources to the metrics engine 1104. The metrics engine 1104 provides event metrics to the analysis engine 1106. The event metrics are used by the analysis engine 1106 to identify events that indicate a system anomaly.

In some examples, the event throttle 1102 receives a signal from the analysis engine 1106 indicating that a particular profile has been compromised. If the event throttle 1102 receives an event associated with the particular profile that has been compromised, the event throttle 1102 does not send the event to the metrics engine 1104, and the event is not used to update the metrics maintained by the metrics engine 1104. By withholding events that are associated with compromised profiles, the metrics maintained by the metrics engine 1104 are maintained in a state that is representative of the uncompromised operation of the service that produces the events.

The rate at which events are provided to the metrics engine 1104 may be controlled on a per profile basis. A throttling bucket is maintained for each metric profile. Certain events in event types contain parameters which are highly variable or arbitrary. Such events may produce a proliferation of metrics and profiles within the metrics engine 1104. Such proliferation is controlled by limiting the rate of creation of new metrics and new profiles within the metrics engine 1104 on a per profile basis. For example, if a series of similar events is received for a given profile, each event in the series of events having a different parameter value, a large number of sub metrics may be created within the profile. If, within a specified amount of time, the number of sub metrics created reaches the limit imposed by the throttling bucket associated with the given profile, the throttling action may be taken. In some examples, the throttling action involves not creating additional sub metrics beyond the imposed limit. In other examples, the throttling action involves delaying the creation of additional sub metrics. A description of burst bucket throttling is described in U.S. patent application Ser. No. 15/176,048, filed Jun. 7, 2016, entitled "Data Exfiltration Control", which is herein incorporated by reference. Additional information is described in U.S. patent application Ser. No. 14/675,730, filed Mar. 31, 2015, entitled "Burst Throttling with Sequential Operation Detection", which is herein incorporated by reference.

In some implementations, the event throttle 1102 acquires information from the metrics engine 1104 indicating a level of confidence in the metrics related to a particular incoming event. If the level of confidence exceeds a threshold value, then the particular incoming event may be filtered from the event stream provided to the metrics engine 1104, or the priority of the particular incoming event may be lowered in favor of other events. If the level of confidence is lower than a threshold value, then the priority of the particular incoming event may be increased and the particular event moved forward in the event stream provided to the metrics engine 1104. The level of confidence may be determined by determining a set of profiles applicable to the particular event, determining a level of confidence for the metrics maintained in each profile of the set of profiles, and then determining the minimum level of confidence of the determined levels of confidence. The level of confidence of each profile may be determined by determining the number of events used to determine each metric in the profile, or by determining the standard deviation for each metric in the profile. In general, metrics generated using larger numbers of events have a higher confidence level than metrics generated using lower numbers of events, and metrics having a lower standard deviation have a higher confidence level than metrics having a higher standard deviation.

The event stream of analysis events comprises some or all of the events received by the event throttle 1102 from the service being monitored. The event throttle 1102 may filter selected events from the stream of analysis events based at least in part on the type or source of each event. In some examples, the event throttle 1102 determines an analysis priority for each of the incoming events, and orders the events provided to the analysis engine 1106 in accordance with the determined analysis priority. The event throttle 1102 limits the rate at which events are provided to the analysis engine 1106. In some implementations, event throttle 1102 monitors the computational load on the analysis engine 1106 and alters the rate at which events are provided to the analysis engine 1106 based at least in part on the availability of computing resources to the analysis engine 1106.

The stream of events provided to the metrics engine 1104 and the stream of events provided to the analysis engine 1106 may be identical and synchronized with each other. However, in some examples, the stream of events provided to the metrics engine 1104 and the stream of events provided to the analysis engine 1106 may differ from each other. Particular events may be filtered from the stream of events provided to the metrics engine 1104 that are not filtered from the stream of events provided to the analysis engine 1106. The order in which events are provided to the metrics engine 1104 may be different than the order in which events are provided to the analysis engine 1106. The rate at which events are provided to the metrics engine 1104 may differ from the rate at which events are provided to the analysis engine 1106.

The metrics engine 1104 provides event metrics to the analysis engine 1106. The event metrics are used by the analysis engine 1106 to determine whether a particular event being analyzed represents an anomaly for the service which generated the event. In various implementations, the analysis engine 1106 identifies one or more profiles that are associated with an event being analyzed. The analysis engine 1106 queries the metric engine 1104 and acquires event metrics for the identified profiles. By examining the event being analyzed in the context of the acquired event metrics, the analysis engine 1106 is able to determine whether the event being analyzed represents an anomaly. The throttling system attempts to supply events to the metrics engine 1104 in a manner that allows the throttling system to acquire and maintain event metrics sufficient to perform reliable analysis by the analysis engine 1106.

In some situations, the metrics engine 1104 may indicate to the analysis engine 1106 that, for a particular event being analyzed, metrics are unavailable or that the level of confidence of the provided metrics is insufficient for reliable analysis. In such examples, the analysis engine 1106 delays the processing of the particular event by returning the particular event to an event queue in the event throttle 1102, placing the particular event in a delay queue within the analysis engine 1106. The metrics engine 1104 may be configured by the analysis engine 1106 to indicate to the analysis engine 1106 when the metrics associated with the particular event are sufficient for reliable analysis.

When the analysis engine 1106 identifies an event that represents an anomaly in the context of the metrics provided by the metrics engine 1104, it generates an anomaly record, and forwards the anomaly record to an anomaly throttle 1108. The anomaly throttle controls the flow of anomaly records to a level-2 analysis engine 1110. The level-2 analysis engine 1110 examines the anomaly records provided by the analysis engine 1106, using metrics associated with the anomalies maintained in the metrics engine 1104. If the level-2 analysis engine 1110 determines that the metrics available from the metrics engine 1104 are not sufficient to perform analysis of the anomaly record, the level-2 analysis engine 1110 signals the anomaly throttle 1108 to delay level-2 analysis until sufficient data is accumulated in the metrics engine 1104. In one example, upon determining that the metrics engine 1104 does not contain sufficient metrics for level-2 analysis, the level-2 analysis engine 1110 causes the anomaly throttle 1108 to delay processing of anomaly records for an amount of time sufficient to accumulate sufficient metrics. In one of limitation, the amount of time is 15 minutes.

Figure 12:
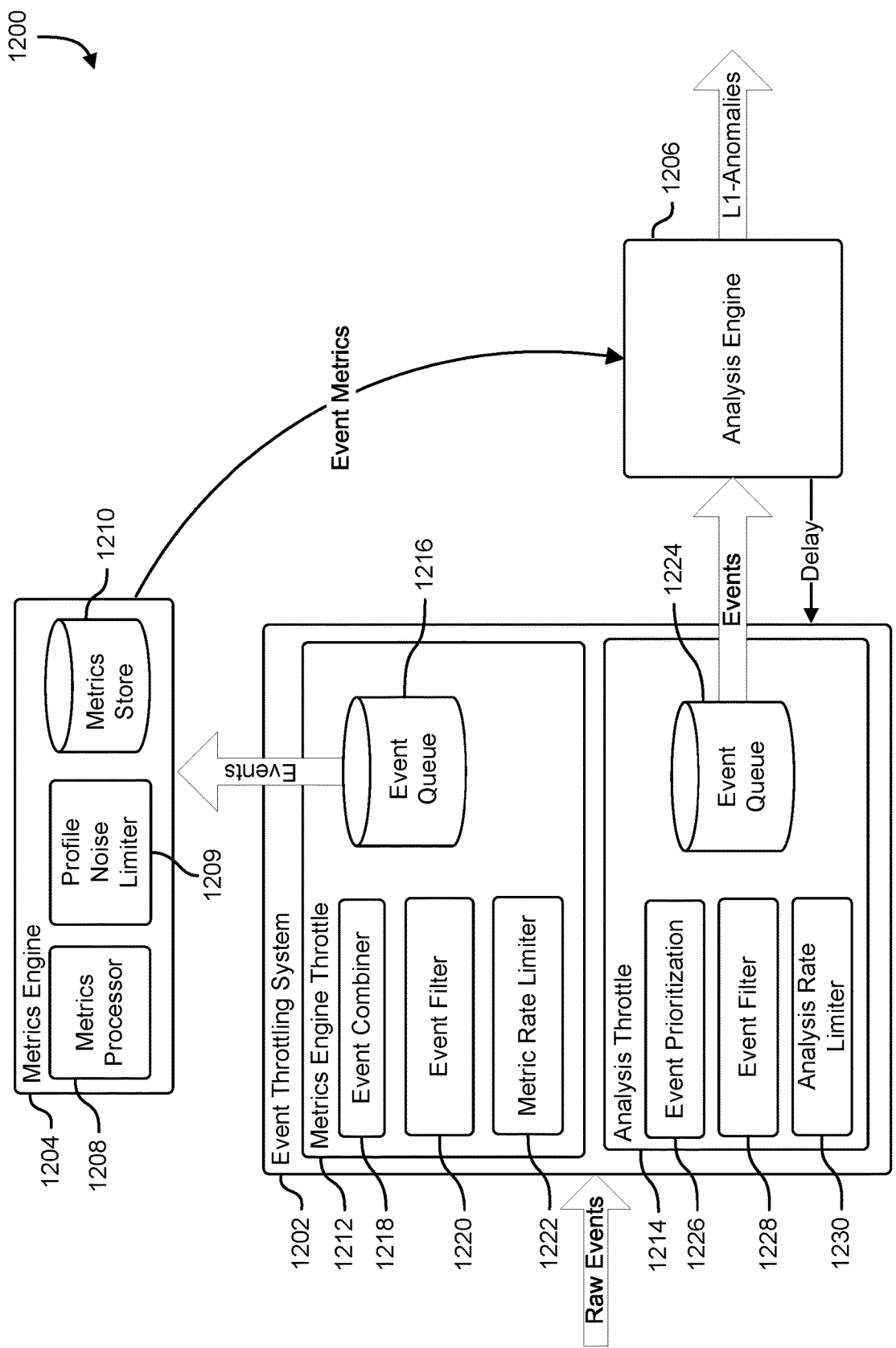
FIG. 12 shows an illustrative example of an event throttling system that includes an analysis throttle and a metrics engine throttle.

FIG. 12 shows an illustrative example of an event throttling system that includes an analysis throttle and a metrics engine throttle. A system diagram 1200 shows an event throttling system 1202, a metrics engine 1204, and an analysis engine 1206. Raw events are produced by a system being monitored, and are provided to the event throttling system 1202. The event throttling system 1202 produces a first event stream which is provided to the metrics engine 1204, and a second event stream which is provided to the analysis engine 1206.

The metrics engine 1204 receives the events from the event throttling system 1202 and produces a collection of metrics which are used by the analysis engine 1206 to identify system anomalies associated with the operation of the system being monitored. The metrics engine 1204 includes a metrics processor 1208, a profile noise limiter 1209, and a metrics store 1210. The metrics processor 1208 may be comprised of a separate processing unit and memory, or may share a processing unit and memory with other components of the event-analysis system. The metrics processor 1208, upon receiving an event from the event throttling system 1202, identifies a profile associated with the received event, and generates a collection of metrics associated with the profile. The metrics engine 1204 may generate metrics for additional profiles that are applicable to the received event. The generation of metrics may be throttled on a per profile basis using a burst bucket associated with each profile. For example, if a substantial number of events associated with a particular profile are received from the event throttling system 1202, the metrics engine 1204 may delay the processing of the events or discard a portion of the events to avoid overwhelming the computing resources allocated to the metrics processor 1208.

In some examples, the profile noise limiter 1209 identifies noisy profiles and noisy metrics and limits the processing of events which are associated with the noisy profiles or noisy metrics by the metrics processor 1208. In some implementations, the profile noise limiter 1209 monitors the generation of new metrics. If a particular profile generates a number of new metrics in excess of a threshold amount, the metric is identified as a noisy metric, and the profile noise limiter 1209 prevents the creation of additional metrics of that type for the particular profile. In some implementations, the profile noise limiter 1209 monitors the generation of new profiles. If the sequence of events causes the generation of a number of new profiles in excess of the threshold amount, the generation of new profiles may be blocked for a period of time by the profile noise limiter 1209. In some examples, the metrics engine 1204 imposes a limit on the number of total number of metrics that may be associated with a profile. In other examples, the metrics engine 1204 imposes a limit on the total number of profiles that may be generated under a parent profile. In yet another example, the metrics engine 1204 imposes storage limitations on each profile. If the creation of a new metric or a new profile will cause the storage limitation to be exceeded, the metrics engine 1204 causes the new metric or the new profile to not be created.

In some examples, in response to an attempt to generate a number of new metrics in excess of a threshold number, the metrics engine 1204 contains the rate at which new metrics may be added to the profile. For example the metrics engine may allow no more than 10 new metrics per minute to be added to a particular profile. In another example, the metrics engine 1204 may allow only a limited percentage of the metrics that are generated to be stored, such as 5 or 10 percent of the metrics generated. In yet another example, the metrics engine may store only a periodic sample of the metrics generated, such as every $5^{th}$ metric, or every $10^{th}$ metric.

The metrics store 1210 retains metrics generated by the metrics engine 1204 in association with one or more applicable profiles. The profiles may be maintained in a tree structure, and the metrics maintained in association with various nodes of the tree structure by way of a link or pointer associated with each profile. The metrics may be recorded in a collection of key-value pairs, such as a multidimensional array. In some implementations, the metrics store 1210 is maintained on a remote data storage service, or a remote database.

The event throttling system 1202 comprises two throttling components. A metrics engine throttle 1212 receives the raw events from the system being monitored, and provides a throttled event stream to the metrics engine 1204. An analysis throttle 1214 received the raw events from the system being monitored, and provides a throttled event stream to the analysis engine 1206. In some implementations, the analysis throttle 1214 may be omitted.

The metrics engine throttle 1212 includes an event queue 1216, an event combiner 1218, an event filter 1220, and a metric rate limiter 1222. As raw events are received by the event throttling system 1202, a copy of each raw event is provided to the metrics engine throttle 1212. The event filter 1220 examines each raw event, and may discard particular events in accordance with one or more event filters. For example, an administrator may configure an event filter to remove events that that have little or no informative value, are unreliable, or originate from outside the system being monitored. Events which are not discarded or placed in the event queue 1216. The event queue 1216 may be implemented as a first in first out queue structure. The metric rate limiter 1222 extracts events from the event queue 1216 and provides the events to the metrics engine 1204 at a rate determined at least in part by the computing resources available to the metrics processor 1208. In some examples, the metrics engine throttle 1212 maintains a minimum number of events in the event queue 1216 so that similar events may be efficiently combined and processed by the metrics engine 1204.

The event combiner 1218 improves the efficiency of the metrics engine 1204 by combining incoming events with similar events in the event queue 1216. In some implementations, the event combiner 1218 receives events from the event filter 1220, and searches the event queue 1216 for a similar event that can be combined with the incoming event. If the event combiner 1218 locates a combinable event in the event queue 1216, the event combiner 1218 combines the events to create a combined event, and returns the combined event to the event queue 1216. For example, if the event combiner 1218 receives a data-read event for a particular user, and upon searching the event queue 1216 for similar events locates a similar data-read event for the particular user. The event combiner 1218 combines the two events to create a combined event. The combined event includes a count of the total number of data-read events, and replaces the similar event in the event queue 1216. In another implementation, the event combiner 1218 periodically scans the event stored in the event queue 1216 and locates sets of combinable events. Each set of combinable events is combined into a single combined event that includes account of events and one or more common properties of the set of events.

The analysis throttle 1214 includes an event queue 1224, an event prioritization component 1226, an event filter 1228, and an analysis rate limiter 1230. Raw events are received by the analysis throttle 1214 and are processed by the event filter 1228. In some examples, the event filter 1228 is configured by an administrator to remove events from event sources that are trusted. In another example, the event filter 1228 is configured to remove events that originate from outside the system being monitored. The event prioritization component 1226 examines incoming events and assigns a priority to each event. The priority of each event may be determined based at least in part on an event source, an event type, or an event parameter. After the events are filtered and prioritized, the analysis throttle 1214 places the events in the event queue 1224. The event queue 1224 may be implemented as priority queue. The analysis rate limiter 1230 pulls events from the event queue 1224 and provides the events to the analysis engine 1206 in first in first out order, and in order of priority.

In some implementations, if the analysis engine 1206 receives an event from the analysis throttle 1214, and determines that the metrics engine 1204 is unable to provide metrics sufficient to perform analysis of the event, the analysis engine 1206 provides a delay signal to the analysis throttle 1214. As a result of receiving the delay signal, the analysis throttle stop sending events to the analysis engine 1206 for an amount of time sufficient to allow the metrics engine 1204 two generate additional metrics. In some examples, the event is returned to the event queue 1224 by the analysis engine 1206, and a hold is placed on the event in the event queue 1224 for an amount of time. While the event is on hold, other events are sent from the analysis throttle 1214 to the analysis engine 1206 and processed. When the hold on the event expires, the event is forwarded from the event queue 1224 to the analysis engine 1206, and the analysis engine 1206 determines whether the event metrics are sufficient to perform anomaly analysis for the event. If the event metrics are sufficient to perform anomaly analysis for the event, the event is analyzed by the analysis engine 1206. If the event metrics are not sufficient perform anomaly analysis for the event, the event is returned to the event queue 1224 and the new hold is placed on the event for an amount of time.

Figure 13:
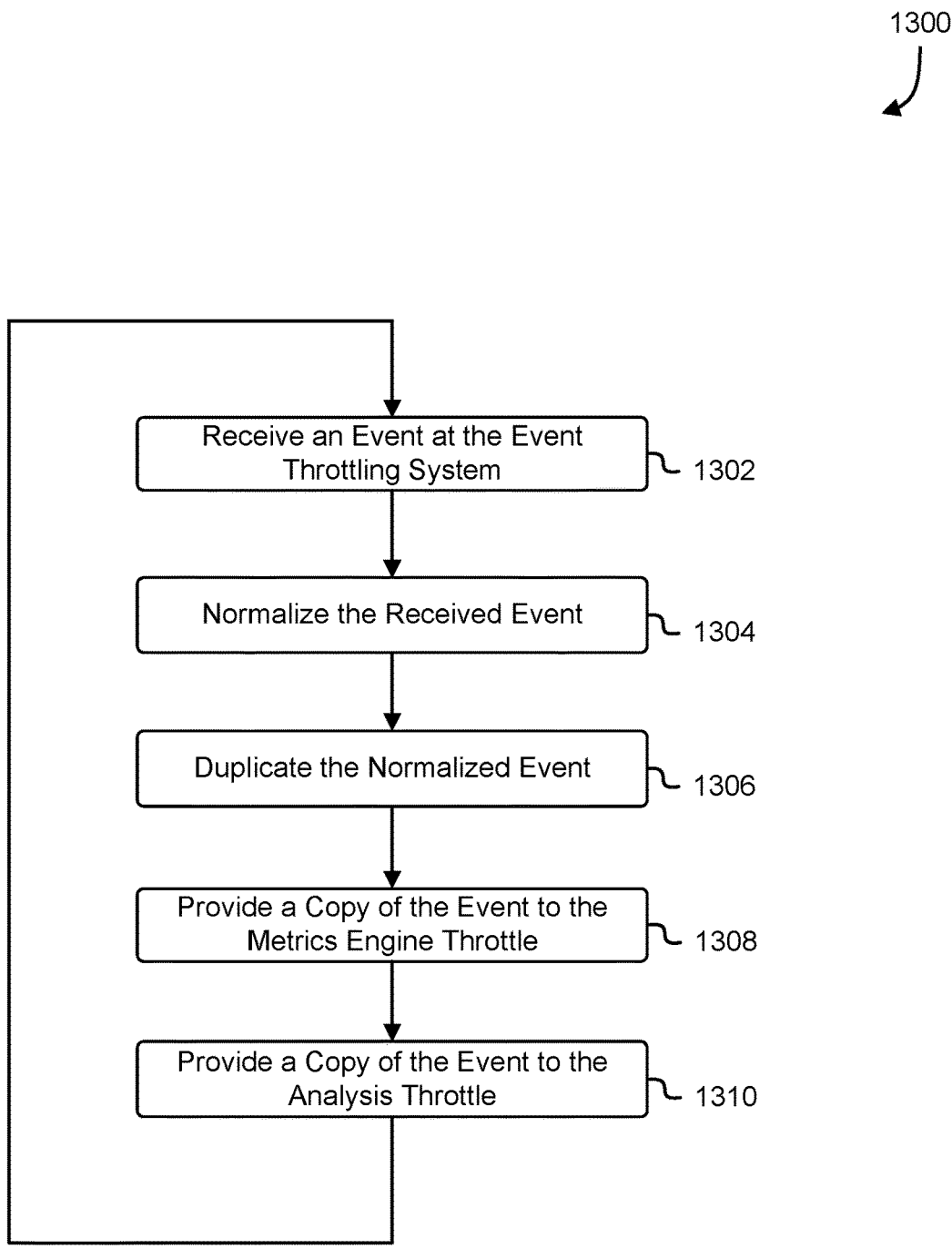
FIG. 13 shows an illustrative example of a process that, as a result of being performed by an event throttling system, provides normalized event streams to a metrics engine throttle and an analysis throttle.

FIG. 13 shows an illustrative example of a process that, as a result of being performed by an event throttling system, provides normalized event streams to a metrics engine throttle and an analysis throttle. A flowchart 1300 shows a process that begins at block 1302 where an event throttling system receives an event from the system being monitored. In some examples, the event throttling system retrieves the event from a system log or an event service. Events may be retrieved from multiple log files are event services in a variety of formats. At block 1304, the event throttling system normalizes the received event. Events are normalized by adjusting each event to conform to a common format used by the event-analysis system. At block 1306, the event throttling system duplicates the normalized event to create an event for the metrics engine throttle and an event for the analysis throttle. One copy of the normalized event is provided 1308 to the metrics engine throttle, and another copy of the normalized event is provided 1310 to the analysis throttle. Execution returns to block 1302 and additional events may be received by the event throttling system.

Figure 14:
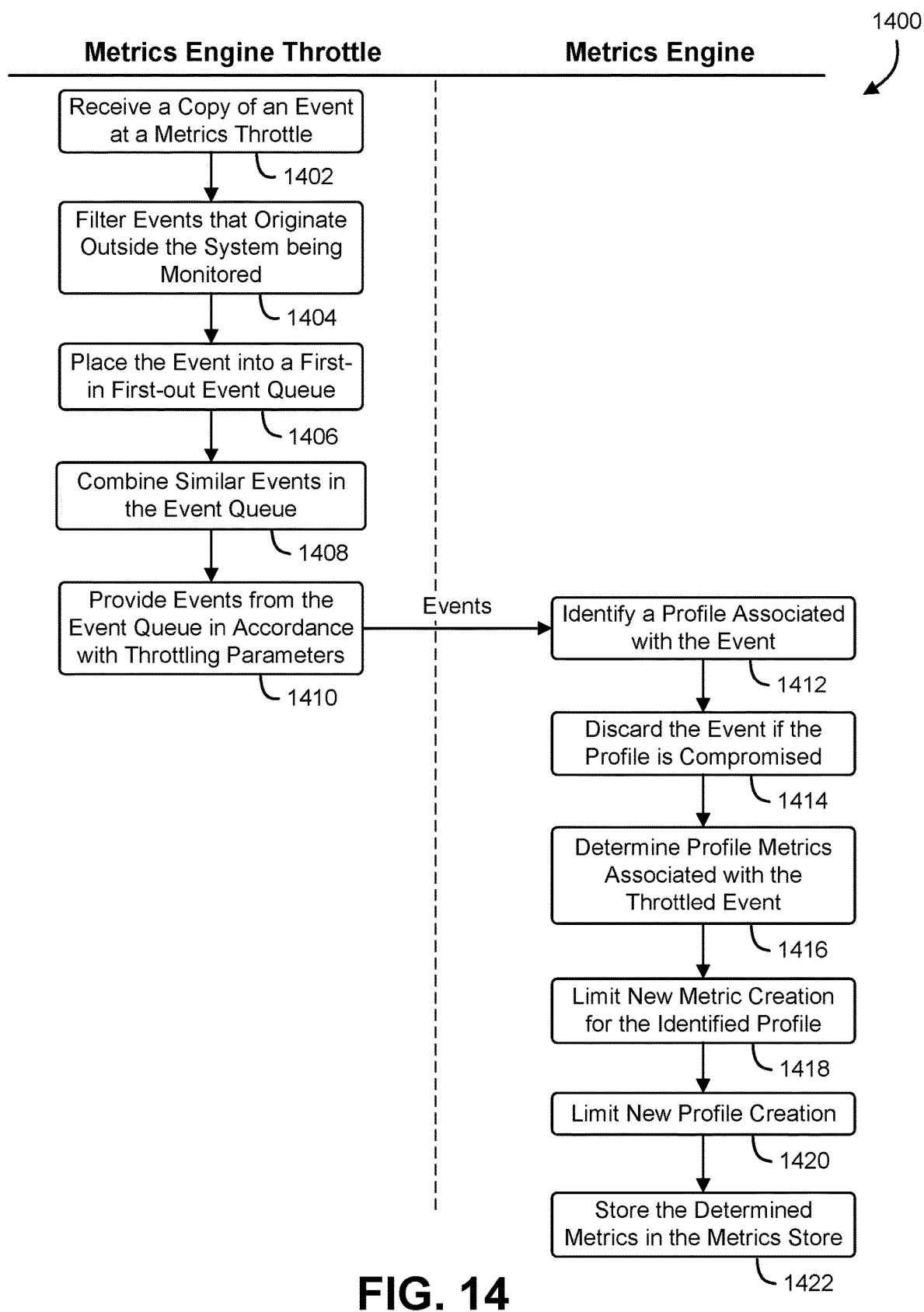
FIG. 14 shows an illustrative example of a process that, as a result of being performed by a metrics engine throttle and a metrics engine, produces metrics from a stream of throttled events.

FIG. 14 shows an illustrative example of a process that, as a result of being performed by metrics engine throttle and a metrics engine, produces metrics from a stream of throttled events. A swim diagram 1400 shows a process that begins at block 1402 with the metrics engine throttle receiving a copy of an event received by an event throttling system. If the received event has not been normalized, the metrics engine throttle normalizes the event by adjusting the event to conform to a format required by the metrics engine. If the metrics engine throttle is unable to normalize the event, the event is discarded. The metrics engine throttle determines the origin of the event, and if the origin of the event is outside the scope of the system being monitored by the event-analysis system, the metrics engine throttle discards 1404 the event. In various implementations, the metrics engine throttle may filter, from the event stream, events from trusted sources or events that do not provide information usable to detect system anomalies. For example, an event log ingested by the event throttling system may include events generated by multiple systems and services, only some of which are monitored for anomalies and event-analysis system. Therefore, to conserve computing resources used by the metrics engine, events generated outside the scope of the system being monitored are discarded.

The remaining events are placed 1406 into a first-in first-out event queue maintained by the metrics engine throttle. The metrics engine throttle searches the event queue for groups of events that are combinable into a single combined event, and combines 1408 the groups of events into single combined events that include a recurrence count. For example, if the metrics engine throttle finds three events indicating a particular user failed to login to the system being monitored, the three events are combined into a single combined event indicating that the particular user failed to log into the system three times. The three events in event queue are replaced by the single combined event, so that the single combined event may be processed more efficiently by the metrics engine.

At block 1410, the metrics engine throttle provides events from the event queue to the metrics engine. The metrics engine throttle provides the events in accordance with throttling parameters configured by the administrator of the event-analysis system. In some examples, the metrics engine throttle is configured to provide events to the metrics engine while maintaining a minimum number of events in the event queue. The minimum number of events in the event queue provides the metrics engine throttle with a sufficient pool of events with which to combine incoming events to produce combined events as described above. In another example, the metrics engine throttle provides the events to the metrics engine in accordance with the amount of computing resources available to the metrics engine.

At block 1412, the metrics engine receives an event from the metrics engine throttle, and identifies a profile associated with the event. The metrics engine imposes a number of limitations on the generation of new metrics and profiles based at least in part on the identified profile. If the metric engine has received a signal from the event-analysis system indicating that the profile is compromised, the metrics engine discards 1414 the event. For example, if the event-analysis system determines that the credentials associated with a user account have been compromised by an attacker, the event-analysis system signals, to the metrics engine, that the profile associated with the user account is compromised. To avoid corrupting the metrics in the profile, the metrics engine does not update metrics for the compromised profile, despite having received events that are applicable to the compromised profile. In some examples, metrics associated with other profiles may be updated using the received event.

At block 1416, the metrics engine determines metrics for the profile using the event. The determined metrics may include updates to existing metrics associated with the profile, the generation of new metrics, and the addition of profiles to the profile hierarchy. For example, a user creation event may result in the creation of a new profile in the profile hierarchy. An event with a new parameter may result in a new metric for the profile. An event with a parameter previously received may result in updates to metrics associated with the parameter. Before writing the determined metrics to a metrics store, the metrics engine imposes limitations 1418 on the number of metrics associated with a profile. If the number of metrics associated with the profile exceeds a configured maximum number of metrics, the new metrics are not added to the profile. If the determined metrics generated additional profiles, the metrics engine determines 1420 if generating the additional profiles would exceed a maximum number of profiles given the positioning of the profile within the profile hierarchy, and generates the additional profiles only if the maximum number of profiles is not exceeded. In some examples, the metrics engine limits the amount of memory usable by each profile, and the metrics engine does not generate additional profiles that would exceed this limit. At block 1422, the metrics engine writes the determined metrics to the metrics store subject to the metric and profile limitations.

Figure 15:
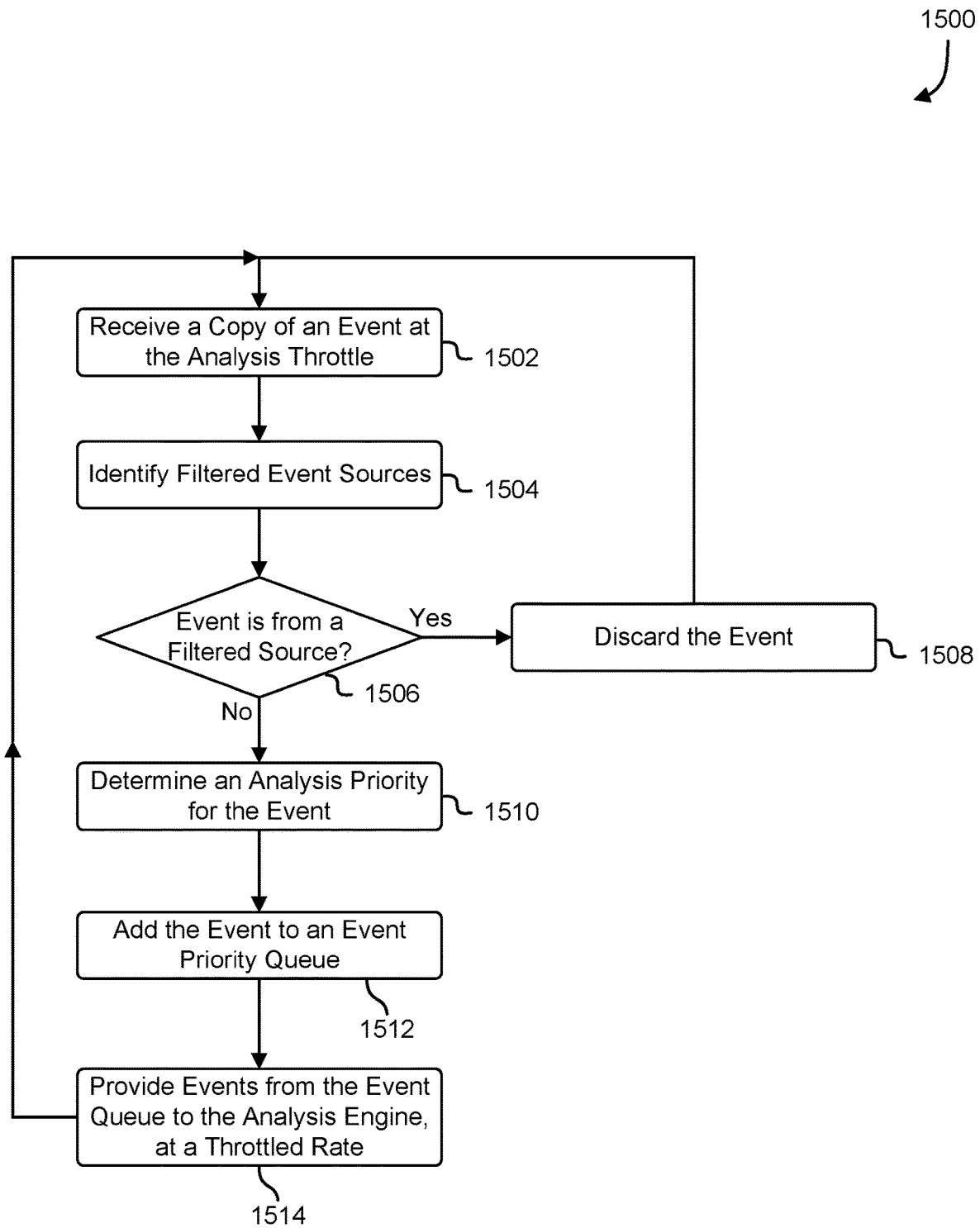
FIG. 15 shows an illustrative example of a process that, as a result of being performed by an analysis throttle, provides a throttled and conditioned stream of events to an analysis engine.

FIG. 15 shows an illustrative example of a process that, as a result of being performed by an analysis throttle, provides a throttled and conditioned stream of events to an analysis engine. A flowchart 1500 shows a process that begins at block 1502 with the analysis throttle receiving a copy of an event from a metrics engine throttle. If the event is not normalized, the analysis throttle normalizes the event to place event in a format usable by the analysis engine. In some examples, events that are unable to be normalized or filtered by removing them from the event stream. At block 1504, the analysis throttle identifies event sources that are filtered from the events. Filtered event sources may be configured by an administrator to remove events from trusted sources, or events outside the scope of the system being monitored. At decision block 1506, the analysis throttle determines whether the event originated from the filtered event source. Execution proceeds to block 1508 and the analysis throttle discards the event. After discarding the event, execution returns to block 1502 where the next copy of an event is received by the analysis throttle.

If the event is not from a filtered event source, the analysis throttle determines 1510 an analysis priority for the event. The analysis priority for the event may be used to alter the order in which events are processed by the analysis engine. Events which are more likely to identify an anomaly, or which are more likely to identify a serious anomaly, are assigned a higher priority. Events that are less likely to identify an anomaly, or which tend to signify relatively benign behavior, are assigned a lower priority. For example, login failures, cryptographic key validation failures, and events associated with threats identified in the thread database may be assigned a high priority. Successful logins, access of public data, and heartbeat events may be assigned a low priority. The events are placed 1512 in a priority queue. The priority queue is a queue that outputs events to the analysis engine in priority order, and first-in first-out for events having the same priority. The priority queue may be maintained within the analysis throttle or within an external storage service. At block 1514, the analysis throttle provides the events from the priority queue to the analysis engine. The analysis throttle may provide the events in accordance with a set of throttling parameters configured by an administrator of the event-analysis system. The rate at which events are provided to the analysis engine may be based at least in part on an amount of computing resources available to the analysis engine.

Figure 16:
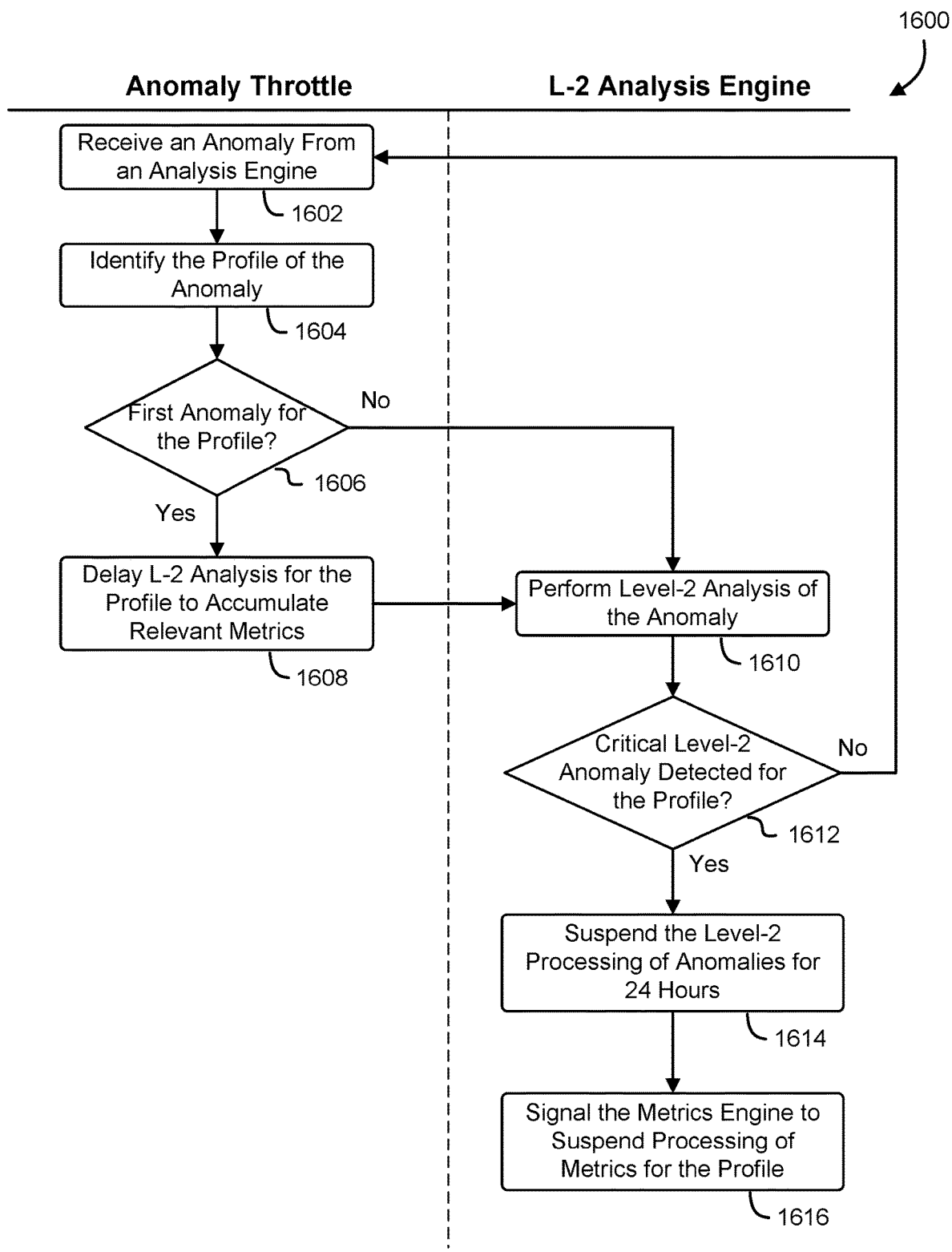
FIG. 16 shows an illustrative example of a process that, as a result of being performed by an anomaly throttle and a level-2 analysis engine, controls the flow of anomalies processed by the level-2 analysis service.

FIG. 16 shows an illustrative example of a process that, as a result of being performed by an anomaly throttle and a level-2 analysis engine, controls the flow of anomalies processed by the level-2 analysis service. A swim diagram 1600 begins at block 1602 where an anomaly throttle receives an anomaly record as a result of level-1 analysis by an analysis engine. At block 1604, the anomaly throttle attempts to identify, from an existing profile hierarchy, a profile associated with the anomaly. If the anomaly throttle determines 1606 that the anomaly is the first anomaly received that is associated with the identified profile, execution proceeds to block 1608 and the anomaly throttle holds the anomaly in an anomaly queue for an amount of time before releasing the anomaly to the level-2 analysis engine for processing. By delaying the level-2 analysis of the anomaly, the anomaly throttle allows the event-analysis system to accumulate additional contextual information in the metrics engine, thereby improving the quality of the level-2 analysis. In some implementations, the amount of delay is dependent on the profile. For example, for an anomaly associated with a first user account, the amount of level-2 analysis delay may be 5 minutes, and for a second user account, the amount of level-2 analysis delay may be 10 minutes. In another implementation, the amount of delay is based at least in part on the type of the anomaly. For example, for an event-source anomaly, the amount of level-2 analysis delay may be 5 minutes, whereas for a login-failure anomaly, the amount of level-2 analysis delay may be 10 minutes.

If the anomaly is not the first anomaly received for the profile, or the delay of the level-2 analysis has been completed, execution proceeds to block 1610. At block 1610, the level-2 analysis engine receives the anomaly and performs the level-2 analysis. The level-two analysis engine processes the anomaly through a chain of escalation analysts. Each escalation analyst measures the anomaly level of the profile associated with the anomaly and determines whether the anomaly level exceeds a configured threshold. In some implementations, a box plot escalation analyst is used to measure the degree to which particular anomaly is an outlier for the associated profile. In another implementation, a textbook escalation analyst is used. The level-2 analysis engine combines the results from each escalation analyst to produce a total anomaly level for the anomaly. If the total anomaly level exceeds a high-threat level configured by the administrator, the level-2 analysis engine determines 1612 that the anomaly is a critical level-2 anomaly for the profile and execution advances to block 1614. If the total anomaly level does not exceed the high-threat level, execution returns to block 1602 and the anomaly throttle receives another anomaly from the analysis engine.

At block 1614, as a result of having determined that the anomaly is a critical level-2 anomaly for the profile, the level-2 analysis engine causes further level-2 processing for the profile to be suspended. To avoid recording information indicating abnormal behavior in the metrics engine, the level-2 analysis engine signals 1616 the metrics engine to suspend processing of metrics for the profile associated with the anomaly.

Figure 17:
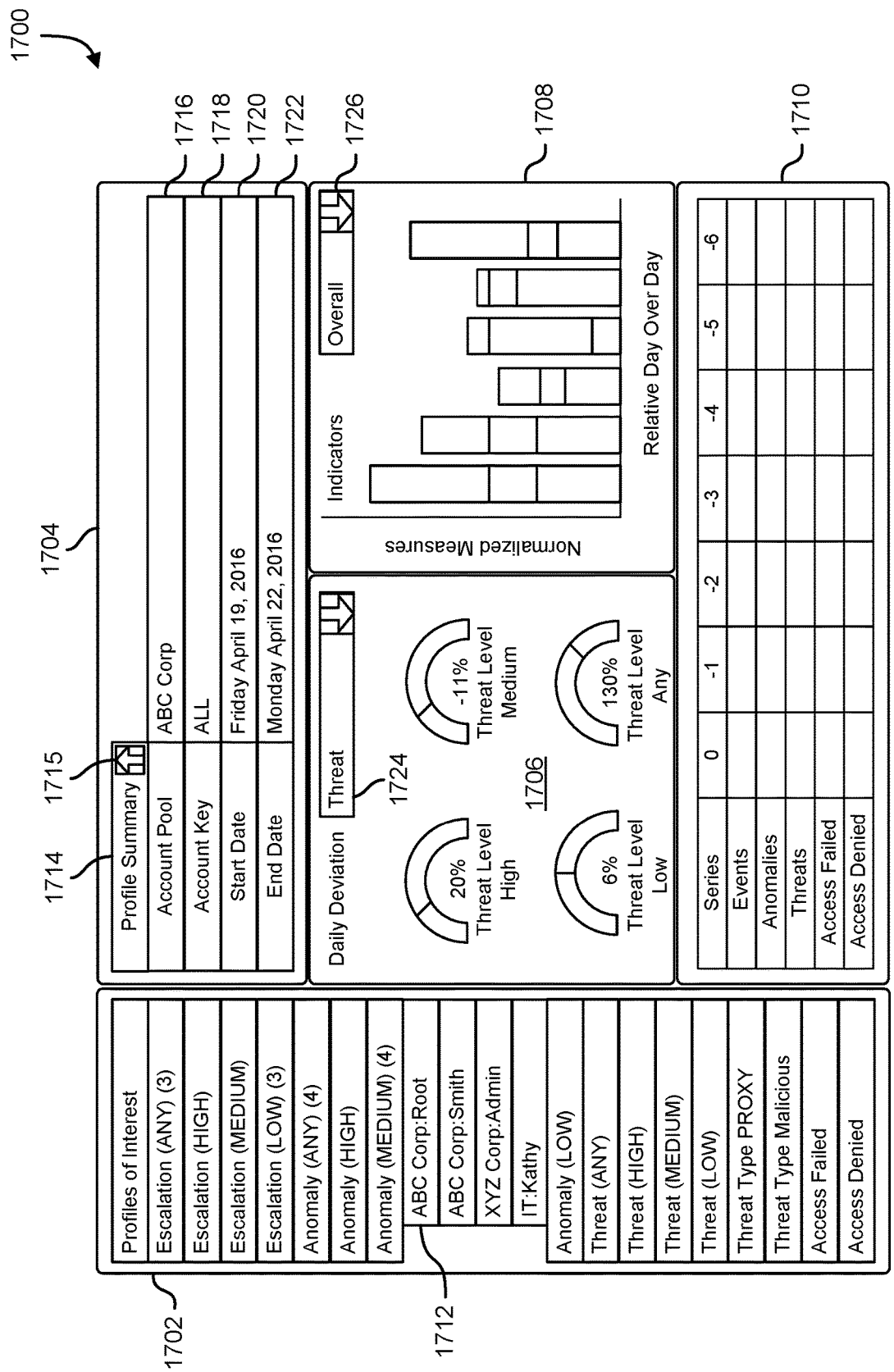
FIG. 17 shows an illustrative example of a user interface ("UI") that allows an operator to view anomalies and metrics generated by an event-analysis system.

FIG. 17 shows an illustrative example of a user interface ("UI") that allows an operator to view anomalies and metrics generated by an event-analysis system. A user interface 1700 includes a profile-selection list 1702, a profile-summary window 1704, a threat-summary window 1706, an indicator graph 1708, and a table of event details 1710.

The profile-selection list 1702 is populated with the profiles maintained by the event-analysis system. The profiles are arranged according to anomalies and events that are associated with each profile. For example, a profile that contains a low-level escalation and a medium level anomaly would be populated under the 'Escalation (LOW)' tab and the 'Anomaly (MEDIUM)' tab. Each tab of the profile-selection list 1702 includes a number in parentheses indicating the number of profiles under each tab. By selecting a particular tab, the user interface expands to show the profiles associated with the tab. For example, if the user selects the 'anomaly (MEDIUM)' tab, the system expands the tab to reveal the profiles 1712 that contain medium level anomalies. The user may select a particular profile from the profiles shown in the profile-selection list 1702. When the user selects a particular profile from the profiles shown in the profile-selection list 1702, the profile-summary window 1704 is updated with information that describes the particular profile.

The profile-summary window 1704 includes a profile-hierarchy control 1714, a profile pool indicator 1716, a profile key indicator 1718, a start date indicator 1720, and an end date indicator 1722. When a profile is selected in the profile-selection list 1702, the profile-summary window 1704 indicates the selected profile (for example, a user account) in the profile key indicator 1718, and the parent profile of the selected profile (for example the parent account) in the profile pool indicator 1716. The start date indicator 1720 and the end date indicator 1722 indicate the time period over which the metrics and anomalies were generated. By selecting a profile-hierarchy control button 1715, the user is able to traverse from the selected profile upward to the parent profile. For example, if the currently selected profile is a user account, and the user selects the profile-hierarchy control button 1715, the profile key indicator 1718 would change from the user account to an indication of "ALL USER ACCOUNTS" that are associated with the indicated parent profile. The metrics and threat summaries shown in the remainder of the user interface are updated in accordance with this change.

The threat-summary window 1706 is able to show day-to-day variation in detected escalations, anomalies, and threats at various levels. The selection drop-down box 1724 allows a user to select between displaying escalations, anomalies, and the threats in the threat-summary window 1706. The indicator graph 1708 allows the user to view the occurrence of events, escalations, anomalies, threats, and critical events over number of days. A drop-down selection box 1726 allows the user to adjust the information displayed by selecting all or some of the information. For example, the user may be allowed to display all of the previously mentioned information, or limit the display of information to only one of escalations, anomalies, threats, or critical events. The information displayed in the indicator graph 1708 is also shown in the table of event details 1710. The table of event details 1710 provides a numerical summary of events, escalations, anomalies, and threats for the profile selected by the user. The table of event details 1710 shows the information over a number of days.

Figure 18:
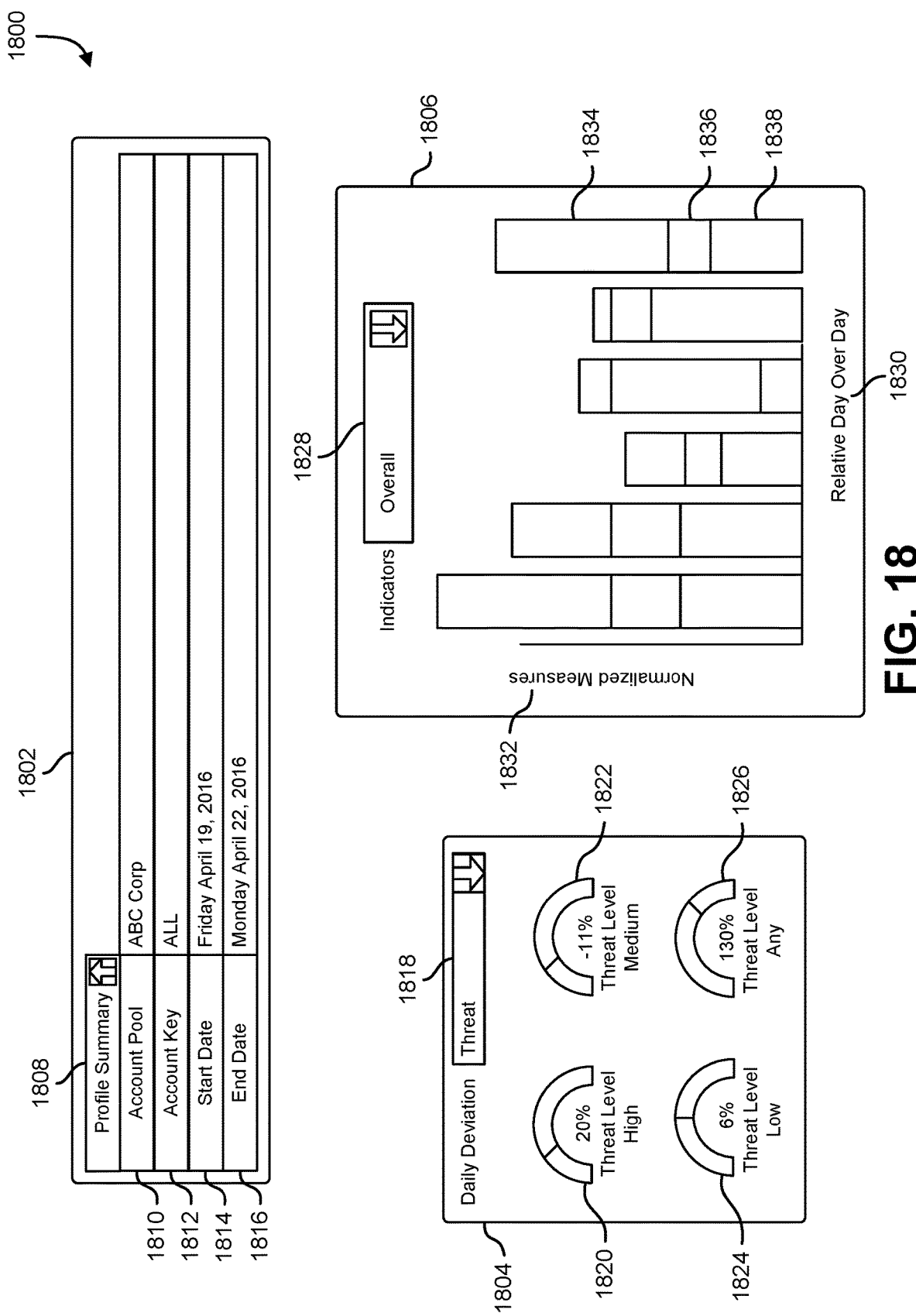
FIG. 18 shows an illustrative example of a user interface that allows an operator to view system anomalies and event trends in a context based at least in part on a selectable profile.

FIG. 18 shows an illustrative example of a user interface that allows an operator to view system anomalies and event trends in a context based at least in part on a selectable profile. A detailed diagram of the user interface 1800 shows a profile-summary window 1802, a threat-summary window 1804, and an indicator graph 1806. The profile-summary window 1802 includes a profile-hierarchy control 1808, a profile-pool indicator 1810, a profile-key indicator 1812, a start-date indicator 1814, and an end-date indicator 1816.

The threat-summary window 1804 includes a selection drop-down box 1818 that allows a user to select between escalations, anomalies, threats, events, or other classifications of information to be displayed. The threat-summary window 1804 includes four indicators, one for each level of criticality of information, and one for an aggregate level of information. As shown in FIG. 18, the threat-summary window 1804 includes a high-level threat gauge 1820, a medium-level threat gauge 1822, and a low-level threat gauge 1824. An aggregate-level threat gauge 1826 provides aggregate information about threats. Each gauge indicates a percentage change in the corresponding measured information between the present period of time and the immediately previous period of time. In the example shown, each gauge indicates changes in the number of detected threats between the current day and the previous day. The changes displayed as a percentage change, and the arc-shaped indicator indicates the change by being segmented to the left for negative percentages, and to the right for positive percentages. In some examples, a portion of the gauges colored red for increasing percentages and green for decreasing percentages.

Indicator graph 1806 includes a drop-down selector 1828 that controls the information shown in each bar of a bar graph. The bar graph has an X-axis 1830 that indicates the passage of time in days, and a Y-axis 1832 that indicates a normalized number of events, threats, or other information selected by the user. Each bar in the bar graph is made up of one or more sub bars 1834, 1836, and 1838. In some examples, a legend is provided to indicate what each sub bar represents. For example, sub bars may be used to represent high, medium, and low level anomalies.

The number of events, anomalies, and threats may vary widely making it difficult to distinguish trends on a single graph. Therefore, in some implementations, information displayed on the indicator graph 1806 is scaled so that the maximum shown amount of any particular category of information is 100 units. For example, if the number of events per day varies between 20,000 and 35,000, the number of events for each day will be multiplied by 100/35,000 so that each sub bar representing an event will be in the range of 0 to 100. The same scaling process is performed on the data used to generate each sub bar, and therefore each sub bar is in the range of 0 to 100. Scaling the data in this way allows the user to see trends involving increasing or decreasing anomalies, threats, or escalations.

Figure 19:
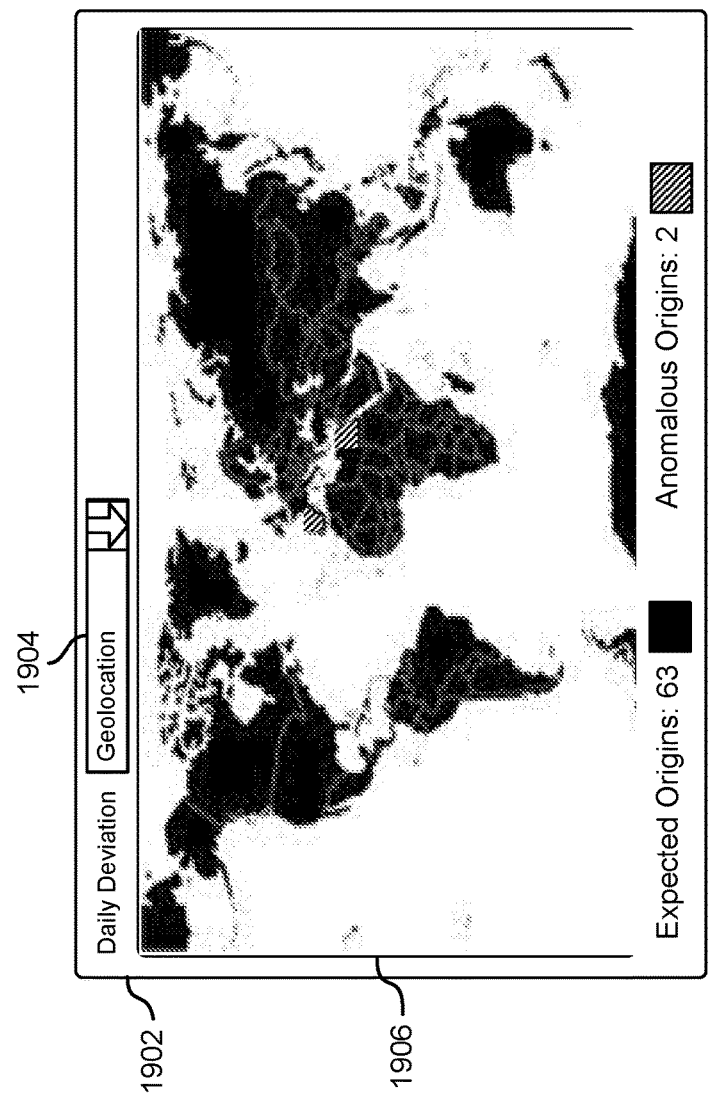
FIG. 19 shows an illustrative example of a user interface that allows an operator to view expected and anomalous event origins.

FIG. 19 shows an illustrative example of a user interface that allows an operator to view expected and anomalous event origins. In some implementations, the event-analysis system may provide a user interface that identifies requests that originate from unexpected request origins. A wireframe diagram 1900 shows a request-geolocation dialog 1902. A user is able to select a variety of display options from a drop-down selection control 1904. One of the options available to the user via the drop-down selection control 1904 is a geographic map showing where requests have been sent from unexpected origins. When the appropriate selection is made by the user, the request-geolocation dialog 1902 includes a world map 1906. The world map 1906 displays regions from which requests have been received by the system being monitored. In some examples, the regions are divided into countries. Regions may also be divided into continents, states, counties, cities, or time zones. A map legend indicates where requests have been received from. Particular regions are colored or textured to indicate expected regions from which requests have been received, regions from which unexpected requests have been received, and regions from which requests have not been received.

Figure 20:
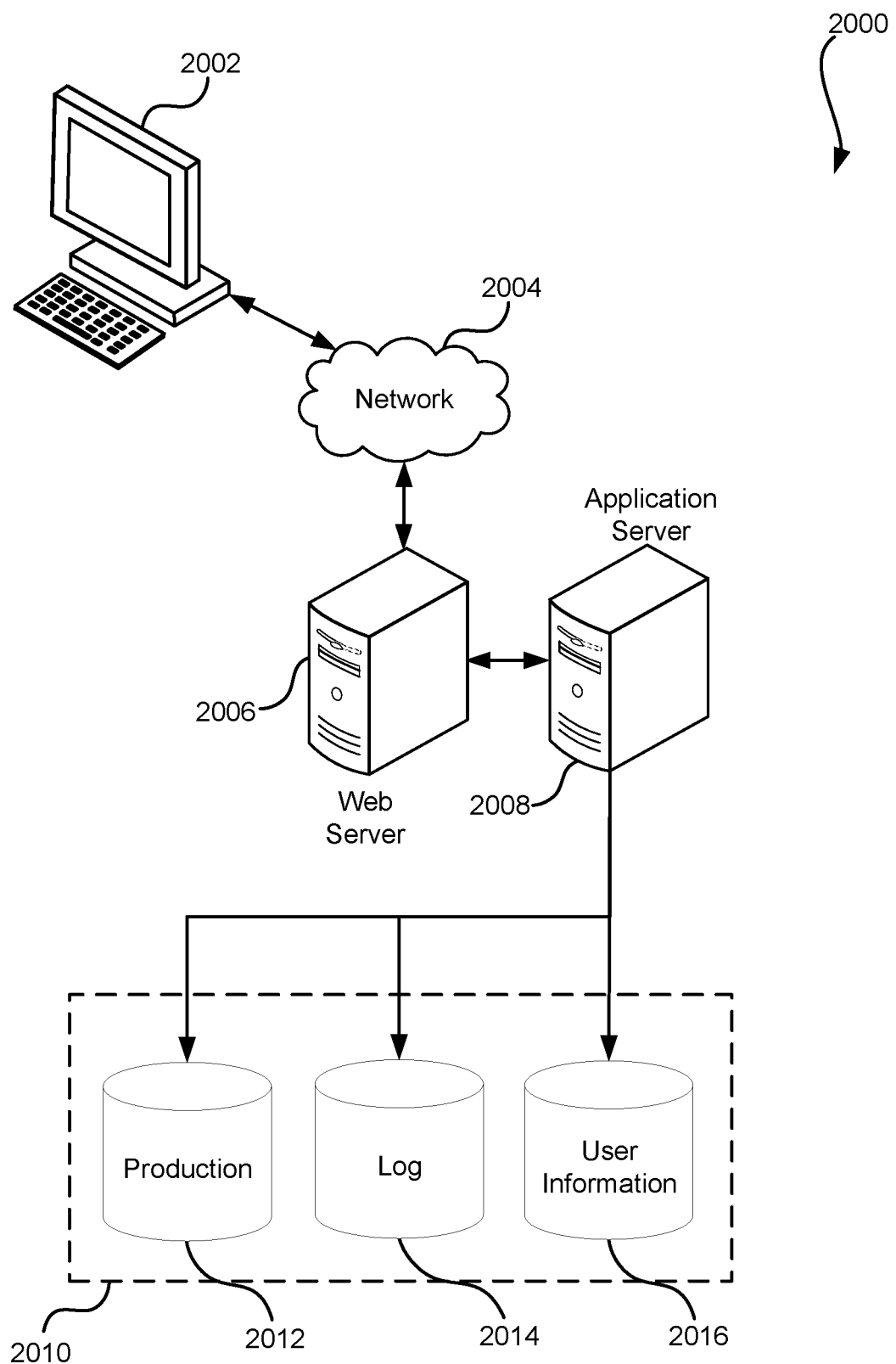
FIG. 20 illustrates an environment in which various embodiments can be implemented.

FIG. 20 illustrates aspects of an example environment 2000 for implementing aspects in accordance with various embodiments. As will be appreciated, although a web-based environment is used for purposes of explanation, different environments may be used, as appropriate, to implement various embodiments. The environment includes an electronic client device 2002, which can include any appropriate device operable to send and/or receive requests, messages, or information over an appropriate network 2004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part on the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 2006 for receiving requests and serving content in response thereto, although for other networks an alternative device serving a similar purpose could be used as would be apparent to one of ordinary skill in the art.

The illustrative environment includes at least one application server 2008 and a data store 2010. It should be understood that there can be several application servers, layers, or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 2002 and the application server 2008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 2010 can include several separate data tables, databases, data documents, dynamic data storage schemes, and/or other data storage mechanisms and media for storing data relating to a particular aspect of the present disclosure. For example, the data store illustrated may include mechanisms for storing production data 2012 and user information 2016, which can be used to serve content for the production side. The data store also is shown to include a mechanism for storing log data 2014, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 2010. The data store 2010 is operable, through logic associated therewith, to receive instructions from the application server 2008 and obtain, update, or otherwise process data in response thereto. The application server 2008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 2002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 20. Thus, the depiction of the system 2000 in FIG. 20 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

Embodiments of the disclosure can be described in view of the following clauses:

1. A computer-implemented method, comprising:
under the control of one or more computer systems configured with executable instructions,
receiving an event stream from a system being monitored;
providing, to a metrics engine, an event from the event stream via an event queue;
identifying a profile associated with the event;
generating, based at least in part on the event, a new metric associated with the profile;
determining whether a number of existing metrics associated with the profile exceeds a threshold number of metrics for the profile; and
as a result of determining that the number of existing metrics associated with the profile does not exceed a threshold number of metrics for the profile, retaining the new metric in association with the profile.

2. The computer-implemented method of clause 1, further comprising:
providing an additional event from the event stream to an analysis engine; and
identifying an anomaly based at least in part on the additional event and metrics provided by the metrics engine, the metrics associated with a profile which is associated with the additional event.

3. The computer-implemented method of clauses 1 or 2, further comprising:
assigning a priority to the events in the event stream;
placing the events in the event stream into a priority queue; and
selecting the additional event from the priority queue based at least in part on the priority of the additional event.

4. The computer-implemented method of any of clauses 1 to 3, further comprising:
combining the event with an additional event from the event queue to produce a combined event, the combined event including an occurrence count;
replacing the event and the additional event with the combined event; and
providing the combined event to the metrics engine.

5. A system, comprising at least one computing device configured to implement one or more services, wherein the one or more services:
selects an event generated by a system being monitored;
identifies a profile associated with the event, the profile having an associated collection of metrics;
generates, based at least in part on the event, one or more additional metrics;
determines whether adding the additional metrics to the collection of metrics would exceed a limitation associated with the profile;
as a result of having determined that the limitation would be exceeded, not adding at least one of the additional metrics to the collection of metrics associated with the profile; and
as a result of having determined that the limitation would not be exceeded, adding the additional metrics to the collection of metrics associated with the profile.

6. The system of clause 5, wherein the one or more services further:
identifies an additional profile associated with the event, the additional profile being associated with a second collection of metrics;
generates, based at least in part on the event, a second set of additional metrics;
determines that adding the second set of additional metrics to the second collection of metrics does not exceed a limitation associated with the additional profile; and
as a result of having determined that the limitation associated with the additional profile is not exceeded, adding the second set of additional metrics to the second collection of metrics associated with the additional profile.

7. The system of clause 5 or 6, wherein the limitation associated with the profile is an amount of storage space allocated to the profile.

8. The system of any of clauses 5 to 7, wherein the limitation associated with the profile is a level of confidence associated with the profile, the level of confidence based at least in part on a standard deviation of a metric associated with the profile.

9. The system of any of clauses 5 to 8, wherein the one or more services further:
determines that the collection of metrics are based at least in part on at least a threshold number of events; and
as a result of having determined that the collection of metrics are based at least in part on at least a threshold number of events, providing the event to an analysis engine, the analysis engine determining whether the event indicates an anomaly based at least in part on the collection of metrics.

10. The system of any of clauses 5 to 9, wherein the one or more services further:
receives, from an analysis engine, an indication that a critical anomaly has been detected in association with the profile; and
as a result of receiving the indication, preventing changes to the collection of metrics associated with the profile.

11. The system of any of clauses 5 to 10, wherein the one or more services further as a result of receiving the indication, deletes the collection of metrics associated with the profile.

12. The system of any of clauses 5 to 10, wherein the one or more services further:
determines that the event originates from a trusted source; and
as a result of determining that the event originates from a trusted source, discards the event.

13. A non-transitory computer-readable storage medium having stored thereon executable instructions that, as a result of being executed by one or more processors of a computer system, cause the computer system to at least:

acquire an event record from an event source;

identify a number of profiles from a profile hierarchy that are applicable to the event record; and produce metrics corresponding to a profile of the number of profiles, the production of metrics corresponding to the profile subject to a limitation associated with the corresponding profile.

14. The non-transitory computer-readable storage medium of clause 13, wherein the instructions that cause the computer system to acquire an event record from an event source further include instructions that cause the computer system to:

receive a first event and a second event from the event source;

determine that the first event and the second event are combinable; and combine the first event and the second event to acquire the event record.

15. The non-transitory computer-readable storage medium of clause 13 or 14, wherein:

the event source is an event queue maintained by the computer system; and the instructions further comprise instructions that, as a result of being executed by the one or more processors, cause the computer system to the computer system maintains a minimum number of events in the event queue.

16. The non-transitory computer-readable storage medium of any of clauses 13 to 15, wherein the instructions further comprise instructions that, as a result of being executed by the one or more processors, cause the computer system to:

maintain a burst bucket in association with a particular profile in the hierarchy of profiles, the burst bucket having an associated bucket level adjusted in response to metrics produced in association with the particular profile; and the limitation associated with the particular profile based at least in part on the bucket level of the burst bucket.

17. The non-transitory computer-readable storage medium of any of clauses 13 to 16, wherein the instructions further comprise instructions that, as a result of being executed by the one or more processors, cause the computer system to identify, based at least in part on metrics associated with the number of profiles, a collection of escalations, a collection of anomalies, and a collection threats.

18. The non-transitory computer-readable storage medium of any of clauses 13 to 17, wherein the instructions further comprise instructions that, as a result of being executed by the one or more processors, cause the computer system to present an interface to a user that allows the user to:

select a particular profile from a number of profile collections, wherein a profile collection of the number of profile collections is associated with a particular type of escalation, anomaly, or threat; and select a parent-profile control element to change the selected profile to a parent profile of the particular profile within the profile hierarchy.

19. The non-transitory computer-readable storage medium of any of clauses 13 to 18, wherein the instructions further comprise instructions that, as a result of being executed by the one or more processors, cause the computer system to as a result of a user selecting the particular profile from the number of profile collections, presenting a daily history of anomalies, escalations, and threats for the particular profile.

20. The non-transitory computer-readable storage medium of any of clauses 13 to 19, wherein:

the daily history is presented as a bar chart with a number of bars, the number of bars representing different time periods, and the number of bars having one or more corresponding sub bars;

the corresponding sub bars associated with a particular bar represent different types of escalation, anomaly or threat; and the one or more corresponding sub bars that represent a particular type of escalation, anomaly, or threat are scaled to a constant value.

21. A computer-implemented method, comprising:

under the control of one or more computer systems configured with executable instructions, acquire, from a log file generated by a service, a log entry;

create, based at least in part on the log entry, an event record, the event record having a set of data dimensions;

identify, based at least in part on the set of data dimensions, a profile that is applicable to the event record, the profile being part of a profile hierarchy;

identify a set of applicable profiles that includes the profile and one or more additional profiles based at least in part on a position of the profile in the profile hierarchy;

update, for each applicable profile in the set of applicable profiles, a set of metrics associated with each applicable profile using the event record's set of data dimensions; and determine whether the event represents an anomaly based at least in part on a comparison of the set of data dimensions to the set of metrics associated with each applicable profile of the set of applicable profiles.

22. The computer-implemented method of clause 21, wherein whether the event represents an anomaly is determined at least in part by:

determining a weight of each metric in the set of metrics associated with each applicable profile of the set of applicable profiles;

determining an anomaly level based at least in part on the weight of each metric in the set of metrics associated with each applicable profile of the set of applicable profiles; and comparing the anomaly level to a threshold anomaly level.

23. The computer-implemented method of clause 21 or 22, further comprising:

as a result of determining that the event represents an anomaly;

the anomaly is used to update an anomaly metric that is associated with the profile; and the anomaly is determined to be benign based at least in part on the anomaly metric.

24. The computer-implemented method of any of clauses 21 to 23, further comprising:

retrieving threat information from a threat database, the threat database identifying at least one of a malicious IP address, a geographical threat, a malicious URL, or an anonymous network exit node;

determining that the event is associated with a threat identified by the threat information;

as a result of determining that the event is associated with the threat, determining that the event is a threat to the service; and add threat information to the threat database based at least in part on the event.

25. A system, comprising at least one computing device configured to implement one or more services, wherein the one or more services:

identifies a set of applicable profiles based at least in part on one or more parameters parsed from an event record generated by a service, the applicable profiles related to each other through a profile hierarchy;

updates metrics associated with the set of applicable profiles based at least in part on the one or more parameters; and determines whether the event record describes an anomaly for a particular profile of the set of applicable profiles in part by comparing the one or more parameters to the updated metrics associated with the particular profile.

26. The system of clause 25, wherein the one or more services further:

creates a new profile within the profile hierarchy, the new profile being based at least in part on at least one of the one or more parameters parsed from the event record.

27. The system of clause 25 or 26, wherein the one or more services further acquires the event record by at least in part:

retrieving a portion of a log file generated by the service;

deriving the event record from the portion of the log file; and parsing the one or more parameters from the event record.

28. The system of any of clauses 25 to 27, wherein the one or more services further receives a notification from a message queue service that causes the one or more services to acquire the event record.

29. The system of any of clauses 25 to 28, wherein the profile hierarchy is retained by the one or more services in a tree structure having a set of nodes, each node of the set of nodes representing a profile and associated metrics.

30. The system of any of clauses 25 to 29, wherein determining whether the event record describes an anomaly is accomplished at least in part by determining a score for the anomaly, the score based at least in part on a combination of score components, each score component associated with a profile of the set of applicable profiles.

31. The system of any of clauses 25 to 30, wherein:

each score component associated with a profile is modified by a component weight; and the component weight based at least in part on a count of profiles that match the anomaly which are at a level that matches the level of the particular profile within the profile hierarchy.

32. The system of any of clauses 25 to 30, wherein the set of applicable profiles are identified by at least in part determining that the one or more parameters parsed from the event record match the metrics associated with each applicable profile in the set of applicable profiles.

33. A non-transitory computer-readable storage medium having stored thereon executable instructions that, as a result of being executed by one or more processors of a computer system, cause the computer system to at least:

identify a set of applicable profiles based at least in part on information derived from an event record generated by a service, the applicable profiles related to each other via a profile hierarchy;

cause metrics associated with the set of applicable profiles to be modified based at least in part on the information derived from the event record to form modified metrics; and determine whether the event record indicates a service anomaly by comparing the information to the modified metrics.

34. The non-transitory computer-readable storage medium of clause 33, wherein the instructions that cause the computer system to identify a set of applicable profiles further include instructions that cause the computer system to:

derive a set of features from the information derived from the event record; and identify particular profiles in the profile hierarchy having at least one feature in common with the set of features.

35. The non-transitory computer-readable storage medium of clause 33 or 34, wherein the instructions that cause the computer system to determine whether the event record indicates a service anomaly further include instructions that cause the computer system to determine a level of confidence for the anomaly by at least in part determining, for each applicable profile in the set of applicable profiles, a count of features in the set of features from the information derived from the event record which are present in the applicable profile.

36. The non-transitory computer-readable storage medium of any of clauses 33 to 35, wherein the instructions that cause the computer system to determine whether the event record indicates a service anomaly further include instructions that cause the computer system to:

modify the level of confidence for the anomaly based at least in part on a confidence weight, the confidence weight based at least in part on a count of additional anomalies that match a property of the service anomaly.

37. The non-transitory computer-readable storage medium of any of clauses 33 to 35, wherein the instructions further comprise instructions that, as a result of being executed by the one or more processors, cause the computer system to:

update anomaly metrics associated with the applicable profiles based at least in part on the anomaly; and determine that the anomaly is not malicious by at least in part comparing the anomaly to the anomaly metrics.

38. The non-transitory computer-readable storage medium of any of clause 33 or 34, wherein the instructions further comprise instructions that, as a result of being executed by the one or more processors, cause the computer system to:

acquire threat information from a threat database;

determine that the event record is associated with a threat described in the threat information; and as a result of having determined that the event record is associated with a threat, modify a level of confidence associated with the anomaly.

39. The non-transitory computer-readable storage medium any of clauses 33, 34, and 38, wherein the instructions further comprise instructions that, as a result of being executed by the one or more processors, cause the computer system to:

determine whether the computer system is a threat-data leader;

as a result of determining that the computer system is a threat-data leader, saving the threat information to a shared threat-data store; and as a result of determining that the computer system is not a threat-data leader, retrieving the threat information from the shared threat-data store.

40. The non-transitory computer-readable storage medium of any of clause 33, 34, and 38, wherein the instructions further comprise instructions that, as a result of being executed by the one or more processors, cause the computer system to:

retrieve the event record from a shared event queue service, the event queue service accessible by a number of event analysis engines; and store the modified metrics in memory that is accessible to the number of event analysis engines.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, from a log file generated by a service, a log entry;
   creating, based at least in part on the log entry, an event record, the event record including a set of data dimensions;
   identifying, based at least in part on the set of data dimensions, a profile that is applicable to the event record, the profile being part of a profile hierarchy;
   identifying a set of applicable profiles that includes the profile and one or more additional profiles based at least in part on a position of the profile in the profile hierarchy, individual profiles subject to a limit on the amount of memory usable by an individual profile;
   updating, for each applicable profile in the set of applicable profiles, a set of metrics associated with each applicable profile using the event record's set of data dimensions;
   determining whether the event record represents an anomaly based at least in part on a comparison of a score associated with the event to a threshold value, the score determined based on matches of the set of data dimensions and the set of metrics associated with each applicable profile of the set of applicable profiles; and
   providing display information that indicates the anomaly.

2. The computer-implemented method of claim 1, wherein whether the event represents an anomaly is determined at least in part by:
   determining a weight of each metric in the set of metrics associated with each applicable profile of the set of applicable profiles;
   determining an anomaly level based at least in part on the weight of each metric in the set of metrics associated with each applicable profile of the set of applicable profiles; and
   comparing the anomaly level to a threshold anomaly level.

3. The computer-implemented method of claim 1, further comprising:
   as a result of determining that the event represents an anomaly,
      the anomaly is used to update an anomaly metric that is associated with the profile; and
      the anomaly is determined to be benign based at least in part on the anomaly metric.

4. The computer-implemented method of claim 1, further comprising:
   retrieving threat information from a threat database, the threat database identifying at least one of a malicious IP address, a geographical threat, a malicious URL, or an anonymous network exit node;
   determining that the event is associated with a threat identified by the threat information;
   as a result of determining that the event is associated with the threat, determining that the event is a threat to the service; and
   adding threat information to the threat database based at least in part on the event.

5. A system, comprising:
   one or more physical processors; and
   physical memory storing executable instructions that, as a result of being executed by the one or more physical processors, cause the system to:
      identify a set of applicable profiles based at least in part on one or more parameters parsed from an event record generated by a service, the applicable profiles related to each other through a profile hierarchy, the size of an individual applicable profile limited to a threshold amount of memory;
      update metrics associated with the set of applicable profiles based at least in part on the one or more parameters;
      determine a score associated with the event record, the score based on a match between the one or more parameters and a set of metrics associated with a particular profile in the set of applicable profiles;
      determine whether the event record describes an anomaly for the particular profile by comparing the score to a threshold value; and
      cause the anomaly to be indicated on a hardware display.

6. The system of claim 5, wherein the executable instructions further cause the system to:
   create a new profile within the profile hierarchy, the new profile being based at least in part on at least one of the one or more parameters parsed from the event record.

7. The system of claim 5, wherein the executable instructions further cause the system to obtain the event record by at least in part:
   retrieving a portion of a log file generated by the service;
   deriving the event record from the portion of the log file; and
   parsing the one or more parameters from the event record.

8. The system of claim 7, wherein the executable instructions further cause the system to receive a notification from a message queue service that causes the system to obtain the event record.

9. The system of claim 5, wherein the profile hierarchy is retained by the system in a tree structure including a set of nodes, each node of the set of nodes representing a profile and associated metrics.

10. The system of claim 5, wherein determining whether the event record describes an anomaly is accomplished at least in part by determining a score for the anomaly, the score based at least in part on a combination of score components, each score component associated with a profile of the set of applicable profiles.

11. The system of claim 10, wherein:
    each score component associated with a profile is modified by a component weight; and
    the component weight based at least in part on a count of profiles that match the anomaly which are at a level that matches the level of the particular profile within the profile hierarchy.

12. The system of claim 5, wherein the set of applicable profiles are identified by at least in part determining that the one or more parameters parsed from the event record match the metrics associated with each applicable profile in the set of applicable profiles.

13. A non-transitory computer-readable storage medium including stored thereon executable instructions that, as a result of being executed by one or more processors of a computer system, cause the computer system to at least:
    identify a set of applicable profiles based at least in part on information derived from an event record generated by a service, the applicable profiles related to each other via a profile hierarchy, an amount of memory used by an individual applicable profile in the set of applicable profiles limited to a threshold amount;

cause metrics associated with the set of applicable profiles to be modified based at least in part on the information derived from the event record to form modified metrics;

determine a score for the event record, the score based on a degree of matching between the information derived from the event record and a set of metrics associated with a particular profile in the set of applicable profiles;

determine whether the event record indicates a service anomaly for the particular profile based on the score; and generate display data identifying the service anomaly.

14. The non-transitory computer-readable storage medium of claim 13, wherein the instructions that cause the computer system to identify a set of applicable profiles further include instructions that cause the computer system to:

derive a set of features from the information derived from the event record; and identify particular profiles in the profile hierarchy including at least one feature in common with the set of features.

15. The non-transitory computer-readable storage medium of claim 14, wherein the instructions that cause the computer system to determine whether the event record indicates a service anomaly further include instructions that cause the computer system to determine a level of confidence for the anomaly by at least in part determining, for each applicable profile in the set of applicable profiles, a count of features in the set of features from the information derived from the event record which are present in the applicable profile.

16. The non-transitory computer-readable storage medium of claim 15, wherein the instructions that cause the computer system to determine whether the event record indicates a service anomaly further include instructions that cause the computer system to:

modify the level of confidence for the anomaly based at least in part on a confidence weight, the confidence weight based at least in part on a count of additional anomalies that match a property of the service anomaly.

17. The non-transitory computer-readable storage medium of claim 15, wherein the instructions further comprise instructions that, as a result of being executed by the one or more processors, cause the computer system to:

update anomaly metrics associated with the applicable profiles based at least in part on the anomaly; and determine that the anomaly is not malicious by at least in part comparing the anomaly to the anomaly metrics.

18. The non-transitory computer-readable storage medium of claim 13, wherein the instructions further comprise instructions that, as a result of being executed by the one or more processors, cause the computer system to:

acquire threat information from a threat database;

determine that the event record is associated with a threat described in the threat information; and as a result of having determined that the event record is associated with a threat, modify a level of confidence associated with the anomaly.

19. The non-transitory computer-readable storage medium of claim 18, wherein the instructions further comprise instructions that, as a result of being executed by the one or more processors, cause the computer system to:

determine whether the computer system is a threat-data leader;

as a result of determining that the computer system is a threat-data leader, save the threat information to a shared threat-data store; and as a result of determining that the computer system is not a threat-data leader, retrieve the threat information from the shared threat-data store.

20. The non-transitory computer-readable storage medium of claim 13, wherein the instructions further comprise instructions that, as a result of being executed by the one or more processors, cause the computer system to:

retrieve the event record from a shared event queue service, the event queue service accessible by a number of event analysis engines; and store the modified metrics in memory that is accessible to the number of event analysis engines.

* * * * *